US012723199B2

(12) United States Patent
Lentz

(10) Patent No.: US 12,723,199 B2
(45) Date of Patent: Sep. 1, 2026

(54) HYBRID POWER PLANT FOR AUTONOMOUSLY SUPPLYING ENERGY TO BUILDINGS AND INDUSTRIAL FACILITIES

(71) Applicant: IGAS ENERGY GMBH, Stolberg (DE)

(72) Inventor: Karl-Heinz Lentz, Stolberg (DE)

(73) Assignee: iGas Energy GmbH, Stolberg (DE)

(*) Notice: Subject to any disclaimer, the term of this patent is extended or adjusted under 35 U.S.C. 154(b) by 439 days.

(21) Appl. No.: 18/037,743

(22) PCT Filed: Nov. 18, 2021

(86) PCT No.: PCT/EP2021/082229

§ 371 (c)(1),
(2) Date: May 18, 2023

(87) PCT Pub. No.: WO2022/106584

PCT Pub. Date: May 27, 2022

(65) Prior Publication Data

US 2023/0407182 A1 Dec. 21, 2023

(30) Foreign Application Priority Data

Nov. 19, 2020 (EP) .................................... 20208567

(51) Int. Cl.
*C10B 53/02* (2006.01)
*C10J 1/24* (2006.01)
(Continued)

(52) U.S. Cl.
CPC ................. *C10B 53/02* (2013.01); *C10J 1/24* (2013.01); *C10J 3/78* (2013.01); *C25B 1/04* (2013.01);
(Continued)

(58) Field of Classification Search
CPC . C08B 53/02; C25B 1/04; C25B 1/50; H01M 8/0656; H01M 2200/10; H01M 2220/10; H01M 2250/10; Y02E 60/10
See application file for complete search history.

(56) References Cited

U.S. PATENT DOCUMENTS 9,057,138 B2 6/2015 Stuermer et al.
2020/0247701 A1 8/2020 Lentz
2023/0277994 A1 9/2023 Lentz

FOREIGN PATENT DOCUMENTS

CN 116724009 A 9/2023
DE 102009018126 A1 10/2010
(Continued)

OTHER PUBLICATIONS

Search Report received in European Application No. 21 815 487. 0-1014 dated Jun. 26, 2024, with translation, 8 pages.
(Continued)

*Primary Examiner* — James C Goloboy
(74) *Attorney, Agent, or Firm* — Jeff B. Vockrodt; CM Law

(57) ABSTRACT

The subject matter of the invention is a hybrid power plant for the self-sufficient energy supply of buildings, in particular residential buildings and industrial plants, which are located in an area that includes a source of biomass. For local energy supply, the hybrid power plant is arranged preferably in the vicinity of the buildings and industrial plants to be supplied and the source for biomass. The hybrid power plant comprises at least one plant for generation of electricity from renewable energy sources and one power-to-X device for thermochemical conversion of electricity from a renewable energy source and biomass into other energy carriers, which are stored and converted back into electricity when needed. To supply energy to the buildings and industrial facilities to be served during light and dark
(Continued)

Figure 1:
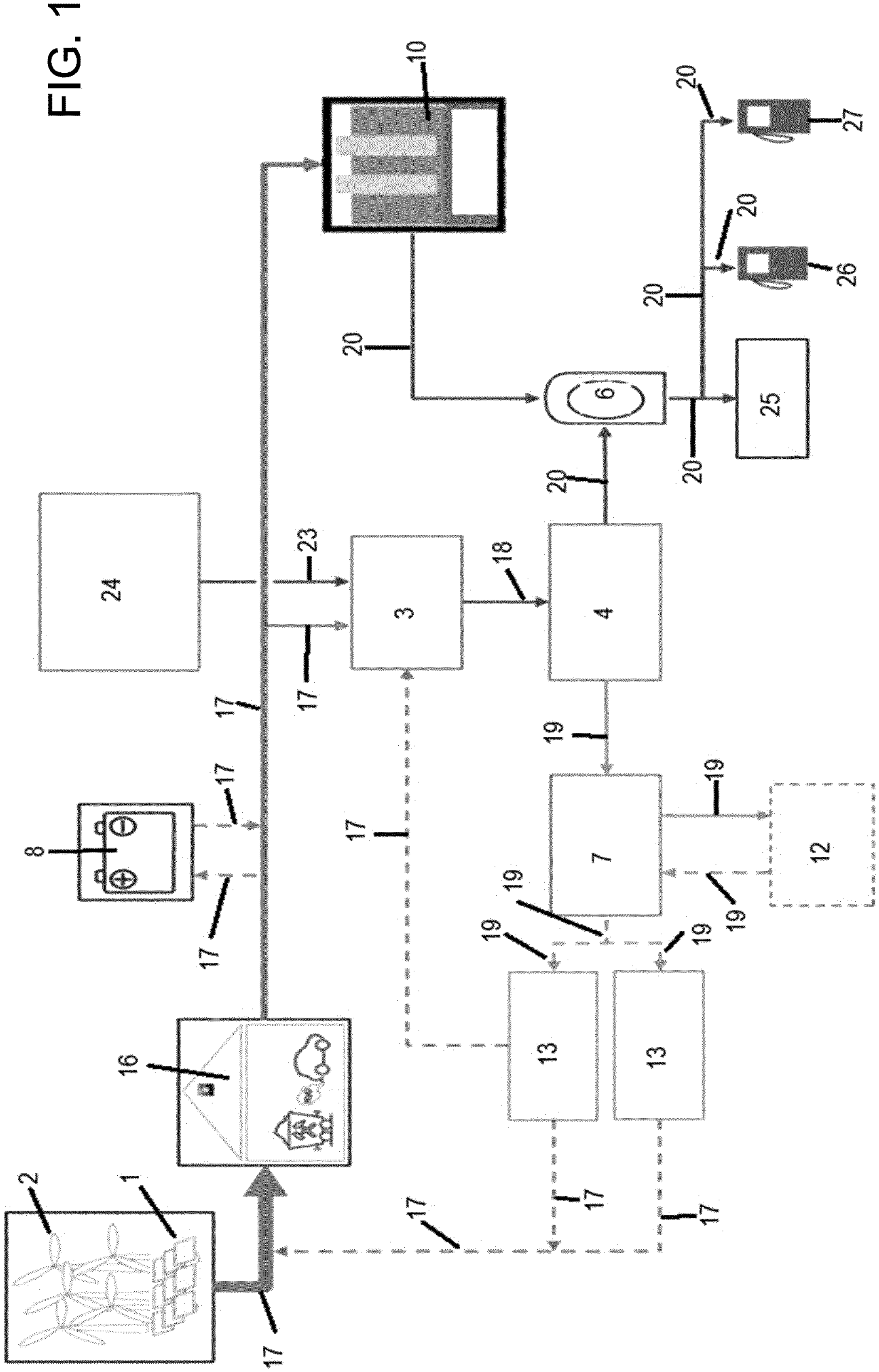

periods, the hybrid power plant includes one or more energy storage devices and at least one plant for recovery of electricity. The energy supply of the buildings or industrial plants by the hybrid power plant is climate and CO2 neutral.

11 Claims, 2 Drawing Sheets

(51) Int. Cl.

| | |
|---|---|
| ***C10J 3/78*** | (2006.01) |
| ***C25B 1/04*** | (2021.01) |
| ***C25B 1/50*** | (2021.01) |
| ***H01M 8/0656*** | (2016.01) |

(52) U.S. Cl.

CPC ............ *C25B 1/50* (2021.01); *H01M 8/0656* (2013.01); *C10J 2300/0916* (2013.01); *C10J 2300/0973* (2013.01); *C10J 2300/1662* (2013.01); *C10J 2300/1684* (2013.01); *C10J 2300/1693* (2013.01); *H01M 2200/10* (2013.01); *H01M 2220/10* (2013.01); *H01M 2250/10* (2013.01); *Y02E 60/10* (2013.01)

(56) References Cited

FOREIGN PATENT DOCUMENTS

| | | | | |
|---|---|---|---|---|
| EP | 3428130 A1 | | 1/2019 | |
| EP | 3434382 B1 | | 9/2019 | |
| EP | 3940041 A1 | | 1/2022 | |
| EP | 4001379 A1 | | 5/2022 | |
| EP | 4247916 | | 9/2023 | |
| WO | WO-2009019159 A2 | * | 2/2009 | ................ H02J 3/28 |
| WO | WO-2013029701 A1 | * | 3/2013 | ............... C10G 2/50 |
| WO | 2019020209 A1 | | 1/2019 | |
| WO | 2022013391 A1 | | 1/2022 | |
| WO | 2022106584 A1 | | 5/2022 | |
| ZA | 202305573 B | | 3/2024 | |

OTHER PUBLICATIONS

Objective Inspection Report received in Saudi Application No. 523440856 dated Mar. 24, 2025, with translation, 8 pages.
Preliminary Report received in International Application No. PCT/EP2021/082229 dated Feb. 23, 2023, 7 pages.
Search Report received in International Application No. PCT/EP2021/082229 dated Mar. 11, 2022, 4 pages.
Written Notice received in International Application No. PCT/EP2021/082229 dated Sep. 27, 2022, 9 pages.
Written Opinion received in International Application No. PCT/EP2021/082229 dated Mar. 11, 2022, 8 pages.
Office Action received in Chinese Application No. 202180090105.9 dated Nov. 4, 2025, with translation, 12 pages.

* cited by examiner

HYBRID POWER PLANT FOR AUTONOMOUSLY SUPPLYING ENERGY TO BUILDINGS AND INDUSTRIAL FACILITIES

The subject matter of the invention is a hybrid power plant for the self-sufficient energy supply of buildings, in particular residential buildings and industrial plants, which are located in an area that includes a source of biomass. For local energy supply, the hybrid power plant is arranged preferably in the vicinity of the buildings and industrial plants to be supplied and the source for biomass. The hybrid power plant comprises at least one plant for generation of electricity from renewable energy source and one power-to-X device for thermochemical conversion of electricity from a renewable energy source and biomass into other energy carriers, which are stored and converted back into electricity when needed. To supply energy to the buildings and industrial facilities to be served during light and dark periods, the hybrid power plant includes one or more energy storage devices and at least one plant for recovery of electricity. The energy supply of the buildings or industrial plants by the hybrid power plant is climate and $CO_2$ neutral.

In the future, energy supply is to be achieved without the use of fossil energy sources such as coal, oil and natural gas, and without nuclear fuels such as uranium and plutonium.

In the heating sector, for example, the fossil energy source natural gas has been used predominantly to generate heat, for example to generate the high-temperature heat required for industrial purposes. In the building sector and in the provision of hot water, for example, heat pumps can be operated with natural gas or electricity to generate low-temperature heat.

In the future, energy will be supplied exclusively by electric power from renewable energy sources such as solar energy (=solar energy, electromagnetic radiation energy), wind energy (=wind power, kinetic energy of air movement), hydropower, biomass (chemical energy) and geothermal energy. Electric power (hereafter electricity) from renewable energy sources will become the primary energy carrier in the future. All sectors whose value creation has so far been based on the use of fossil energy sources will be subject to a transformation process in which the ever-increasing use of electricity from renewable energy sources will play a key role, for example in the mobility sector the propulsion of vehicles via battery using electricity from renewable energy sources and fuel cell propulsion of vehicles with hydrogen, where the hydrogen is produced by the electrolysis of water and the electrolyzer is powered by electricity from renewable energy sources.

The concept of sector coupling connects the sector of electricity from renewable energy sources with other sectors that consume energy and have so far covered their energy supply completely or partially from fossil energy sources, for example the mobility sector and the heating sector. In doing so, Power-to-X (abbreviated "PtX") technologies, with which electricity from renewable energy sources is converted into other energy carriers, connect (=couple) the individual sectors with each other. Sector coupling is seen as a key concept in the energy transition and the development of an energy supply based entirely on the generation of energy from renewable energy sources. Basically, the concept of sector coupling aims at direct and indirect electrification of previously fossil-fueled applications. In direct electrification, the previous application technology is replaced by electricity from renewable energy sources, e.g., gas heating by heat pump 11 powered by electricity from renewable energy sources, vehicles with combustion engine by e-cars. With indirect electrification, electricity from renewable energy sources is converted into another energy carrier, which is then used instead of the previously used fossil energy carrier, whereby the application technology may have to be adapted to the indirect electrification i.e., the other energy carrier. Power-to-heat ("PtH") technologies convert electricity from renewable energy sources into heat. In many cases, the conversion of electricity from renewable energy sources to other energy carriers using PtX technologies uses raw materials that are converted to energy carriers. With power-to-gas ("PtG") technologies, for example, suitable raw materials and electricity from renewable energy sources are converted into gaseous products as energy carriers, such as hydrogen or methane. Power-to-Liquid ("PtL") technologies convert suitable raw materials and electricity from renewable energy sources into liquid energy carriers such as diesel fuel or kerosene. Power-to-Chemicals ("PtC") technologies convert suitable raw materials and electricity from renewable energy sources into chemicals such as methanol ($CH_3OH$) or ammonia ($NH_3$). Suitable PtX devices are also required for the application of PtX technologies.

PtX technologies often apply electrolytic processes, for example, electrolysis of water to convert electricity from renewable energy sources into hydrogen as an energy carrier, with water as the raw material and an electrolyzer as the PtX device. During electrolysis, water is split into $H_2$ and $O_2$ in the electrolyzer using electricity from renewable energy sources. An example of a PtX device for converting electricity from renewable energy sources into heat is, for example, an electrically operated heat pump.

The problem of the fluctuating and unpredictable availability of renewable energy sources such as sun and wind, and the resulting fluctuating availability of electricity from renewable energy sources, can be reduced by sector coupling. Electricity from renewable energy sources must be generated when the renewable energy source is available and then stored, if necessary, until the energy is needed. Without sector coupling, large capacities of expensive electricity storage would be needed to supplement demand with stored electricity from renewable energy sources during periods of low availability of renewable energy sources. Sector coupling compensates for the lack of flexibility in the generation of electricity from renewable energy sources by flexibly coupling energy carriers available in different sectors to compensate for fluctuations in the availability of renewable energy sources. The coupling of energy carriers in individual sectors, act like a delocalized electricity storage in which fluctuations in the availability of electricity from renewable energy sources to supply one sector can be dampened and compensated by energy carriers from other sectors.

Fossil energy sources such as petroleum fractions, natural gas, and to a lesser extent coal and biomass are also used as carbon-supplying raw materials in the chemical sector. To achieve climate protection goals and $CO_2$ neutrality, biomass, $CO_2$ and recycles from the circular economy of organic materials must be used in the future as carbon-supplying raw materials to produce carbon-containing materials, carbon-containing chemicals, and carbon-containing fuels, and must completely replace fossil energy sources.

The current developments are aimed at the nationwide implementation of the use of electricity from renewable energy source, i.e., among others, the nationwide provision of electricity from renewable energy source, the nationwide provision of products and technologies for storage, conversion and distribution of electricity from renewable energy source, the nationwide provision of PtX devices for coupling the sectors, the nationwide provision of energy carrier-specific supply infrastructure and logistics. Therefore, many different companies from different sectors are involved in the implementation. Legal, political, and social issues need to be clarified. Because of the large number of measures required and their coordination, nationwide implementation is complex, involves a long lead time and high investment costs. As a result, implementation is considerably more difficult and delayed. The extent to which, at a defined point in time, the goal, or a defined interim goal of covering the energy supply of an area that includes one or more energy consumers without using fossil energy sources or nuclear fuels has been achieved is not immediately obvious or measurable.

EP 3 428 130 A1 discloses processes for hydrothermal gasification of biomass for the purpose of electricity generation, whereby the product gas obtained is converted into electricity by heat-power machines.

WO 2013/029701 discloses a self-sufficient, decentralized energy supply system for the domestic sector comprising short-term electrical storage units, an electrolyzer, a reactor for the catalytic conversion of $CO_2$ and the hydrogen generated by electrolysis into $CH_4$, methanol or methanoic acid, a tank for storing carbon dioxide and $CH_4$, methanol or methanoic acid, a converter that generates heat and/or electricity from $CH_4$, methanol or methanoic acid, and a gas separator that separates carbon dioxide from the exhaust gases of the converter, which is fed into a circuit.

WO 2009/019159 discloses how to stably operate a power grid and to supply a plurality of consumers, using regeneratively generated energy to produce hydrogen, hydrogenating supplied $CO_2$ with the hydrogen in a hydrogenation plant and producing a gaseous, combustible hydrocarbon (e.g., $CH_4$) is produced and the produced hydrocarbon is converted into electricity in a power plant.

WO 2013/029701 and WO 2009/019159 include a carbon cycle, where $CO_2$ must be supplied from outside, that is produced in agricultural farms, coal- or gas-fired power plants.

One object of the present invention is to completely cover the energy supply of buildings and industrial plants, without using fossil energy sources, independent of the season, time of day and consumption. The implementation for existing buildings and industrial plants should be simple, fast, measurable, and feasible without high investment costs.

This object is achieved by the invention according to patent claims 1 to 10.

The subject matter of the invention is a hybrid power plant for self-sufficient energy supply of an area comprising one or more energy consumers (=for self-sufficient energy supply of one or more energy consumers that are arranged on an area). The hybrid power plant according to the invention comprises one or more plants for generating electricity from renewable energy source, a PtX device for thermochemical conversion of biomass into other energy carriers, preferably a reactor for thermochemical conversion of the generated electricity from renewable energy source and biomass into other energy carriers, which can be stored and converted back into electricity when needed. For this purpose, the hybrid power plant according to the invention comprises one or more energy storages (=storage for storing energy carriers) and at least one plant for recovery of electricity from stored energy carriers. Preferably, the biomass is generated by the one or more energy consumers that the area comprises and that are supplied with energy by the hybrid power plant according to the invention, for example, biowaste or waste-water generated by the one or more energy consumers. In other embodiments, the area includes one or more other sources of biomass 24, for example, a garden that generates garden waste such as mowed lawn and leaves.

The invention relates to a hybrid power plant for self-sufficient energy supply of an area, comprising one or more energy consumers 15 16 and at least one source of biomass 24 comprising,

- at least one plant for generation of electricity from renewable energy source 1 2,
- at least one reactor 3 for thermochemical conversion of biomass into other energy carriers,
- one or more storages for storing energy carriers 6 7 9,
- at least one plant for recovery of electricity from stored energy carriers 13 14,
- wherein at least one plant for generation of electricity from renewable energy source 1 2 is connected to the one energy consumer of the area for supplying energy to the energy consumer 15 16 or wherein at least one plant for generation of electricity from renewable energy source 1 2 is connected to the plurality of energy consumers 15 16 of the area for supplying energy to the energy consumers 15 16, and wherein at least one plant for generation of electricity from renewable energy source 1 2 is connected to the reactor 3 for converting the electricity obtained from renewable energy source into other energy carriers, and wherein the reactor 3 is connected to at least one storage for storing energy carriers for storing the generated other energy carrier, and
- wherein the at least one source of biomass 24 is preferably selected from,
  - (a) at least one energy consumer 15 16 of the area that produces biomass, or
  - (b) at least one other source of biomass 24 comprised in the area, or wherein,
- if the area comprises at least two sources of biomass 24, the at least two sources of biomass 24 are preferably selected from,
  - (a) at least one energy consumer 15 16 of the area that produces biomass, or
  - (b) at least one other source of biomass 24 comprised in the area, or
  - (c) at least one energy consumer 15 16 of the area that produces biomass and at least one other source of biomass 24 comprised in the area.

Preferably, the hybrid power plant comprises at least one electrolyzer 10 for generating hydrogen, wherein at least one plant for generation of electricity from renewable energy source 1 2 is connected to at least one electrolyzer 10 for converting the electricity from renewable energy source into hydrogen as an energy carrier.

In preferred embodiments of the hybrid power plant according to the invention.

- the reactor 3 is connected to the at least one energy consumer 15 16 of the area that produces biomass, or
- the reactor 3 is connected to the at least one other source of biomass 24 comprised in the area, or
- the reactor 3 is connected to the at least one energy consumer 15 16 of the area that produces biomass and to the at least one other source of biomass 24 comprised in the area.

Preferably, the connection is a line for biomass 23. Biomass can be introduced into the reactor 3 from the source of biomass 24 and thermochemically converted into other energy carriers with the electricity generated in the hybrid power plant from renewable energy source. Preferably, the electricity generated from renewable energy source is divided. Excess electricity generated from renewable energy source is electricity generated with the hybrid power plant from renewable energy source 1 2 that is not immediately needed to supply the energy consumer or consumers 15 16. Excess electricity generated or a portion of the excess electricity generated is used to convert biomass to hydrogen and other energy carriers. Other energy carrier or portions of other energy carrier generated by the conversion of biomass and, if applicable, generated hydrogen or portions of generated hydrogen are stored in the one or more storages for storing energy carriers 6 7 9 that are comprised in the hybrid power plant. When needed, e.g., when the electricity generated from the plant for generation of electricity from renewable energy source is insufficient to fully meet the energy supply needs of the energy consumer(s) 15 16 comprised in the area, stored energy carrier, preferably methane, contributes to the energy supply. Gaps in supply are filled by stored energy carriers. The energy supply of the area and of the energy consumer(s) comprised in the area, in particular buildings and/or industrial plants, are completely supplied with energy generated by the hybrid power plant either directly or indirectly by means of a plant for recovery of electricity from stored energy carriers 13 14 and are thus energy self-sufficient. Thereby, the supply of the energy consumers 15 16, which the area comprises, with different forms of energy is possible, for example electricity, heat, hydrogen, methane as a substitute for natural gas. The hybrid power plant, for example the electrolyzer 10, the reactor 3, the storage for storing energy carriers 6 7 9, the plant for recovery of electricity from stored energy carriers 13 14 and other components of the hybrid power plant also represent energy consumers which are preferably also supplied with energy by the hybrid power plant. The hybrid power plant is thus also self-sufficient with respect to its own energy supply. The hybrid power plant thus supplies energy to the energy consumer or consumers comprised in the area and to the hybrid power plant.

It is also an object of the invention to provide an energy self-sufficient unit comprising the hybrid power plant according to the invention and the area supplied with energy self-sufficiently by the hybrid power plant, that comprises one or more energy consumers 15 16 and at least one source of biomass 24.

In contrast to known plants, the hybrid power plant according to the invention does not use $CO_2$, but biomass, which is produced or available on site, in order to convert generated electricity from renewable energy source in the hybrid power plant, i.e. on site, into other energy carriers, to store it and, if required, to generate electricity and, if necessary, other usable forms of energy from this stored energy carrier or to use this stored energy carrier directly in order to ensure the energy supply of the area and of the energy consumer(s) 15 16 which the area comprises completely and self-sufficiently at any time. The hybrid power plant supplies an area comprising one or more energy consumers 15 16, in particular stationary energy consumers such as buildings, residential buildings 15 and industrial plants $CO_2$-neutral (climate-neutral) with energy, in particular with electricity and heat, wherein the generated electricity from renewable energy source is partly, i.e. directly used as far as necessary to ensure the self-sufficient energy supply and partly, i.e. excess electricity generated from renewable energy source is converted into other energy carriers and preferably stored. The hybrid power plant according to the invention comprises a reactor 3 in which biomass with electricity from renewable energy source is directly converted into other energy carriers, especially into chemical energy carriers, preferably into gaseous energy carriers, especially into synthesis gas that preferably comprises essentially hydrogen, methane, carbon dioxide. Preferably, the biomass used as raw material in the reactor 3 is produced in the area by the energy consumer or consumers, for example as waste, especially biowaste, household waste of the energy consumer or consumers of the area and/or the biomass is produced on site by other means and/or the biomass is present in or on the area. The hybrid power plant according to the invention thereby enables the energy consumer(s) 15 16 comprised in the area to be self-sufficient in energy, with no fossil energy sources, no carbon dioxide and no nuclear fuels being additionally required for energy supply. The energy consumer(s) 15 16 of the area become energy self-sufficient through the hybrid power plant because electricity from renewable energy source is converted through thermochemical conversion of the biomass into storable other energy carriers that can be converted back into electricity or used in some other way to supply energy as needed, such as at times when electricity cannot be generated by the plant for generation of electricity from renewable energy source (e.g., due to seasonal and meteorological influences, dark periods, repairs, maintenance), or at times when the demand for electricity or heat is particularly high among the energy consumers 15 16 in the area (e.g. peak consumption periods).

It is also an object of the invention to provide a method for self-sufficient energy supply to one or more energy consumers 15 16, wherein the one or more energy consumers 15 16 are located on or connected to an area, and wherein the area comprises a hybrid power plant according to the invention for self-sufficient energy supply to the area comprising the one or more energy consumers 15 16.

In preferred embodiments of the method, the one or more plants for generation of electricity from renewable energy source 1 2 generate renewable electricity, the energy consumer 15 16 of the area is supplied with the generated electricity from renewable energy source, or with a portion of the generated electricity from renewable energy source, or the several energy consumers 15 16 of the area are supplied with the generated electricity from renewable energy source, or with a portion of the generated electricity from renewable energy source, wherein at least one energy consumer 1516 of the area produces biomass, or the area comprises at least one other source of biomass 24; or at least one energy consumer 15 16 of the area produces biomass and the area comprises at least one other source of biomass 24; and wherein excess generated electricity from renewable energy source or a portion of the excess generated electricity from renewable energy source is used to operate the reactor 3 to thermochemically convert the biomass to other energy carriers to convert excess generated electricity from renewable energy source and biomass from the at least one source of biomass 24 comprised in the area to other energy carriers.

In preferred embodiments of the method, the generated other energy carrier is, for example, stored, or, for example, a portion of the generated other energy carrier is separated and stored, or, for example, a portion of the generated other energy carrier is separated, hydrogenated, and stored.

In preferred embodiments of the method, where the hybrid power plant includes at least one electrolyzer 10, excess generated renewable electricity or a portion of the excess generated renewable electricity is used to operate the at least one electrolyzer 10 to electrolyze water and produce hydrogen, and the produced hydrogen is stored or otherwise used as an energy carrier.

In preferred embodiments of the method, stored energy carrier is reconverted to electricity and used to provide electricity from stored energy carrier to the one or more energy consumers 15 16 of the area if no electricity is generated by the one or more plants for generation of electricity from renewable energy source 1 2, or insufficient electricity from renewable energy source is generated 1 2 to supply energy to the one or more energy consumers 15 16 of the area.

Preferably, the hybrid power plant comprises lines for electricity 17, wherein at least one plant for generation of electricity from renewable energy source 1 2 is connected to the one or more energy consumers 15 16 via at least one line for electricity 17, wherein at least one plant for generation of electricity from renewable energy source 1 2 is connected to the reactor 3 via at least one line for electricity 17, and wherein at least one plant for generation of electricity from renewable energy source 1 2 is connected to at least one electrolyzer 10 via at least one line for electricity 17, and wherein the plants for the generation of electricity from renewable energy source 1 2 may be the same or different. Preferably, the generated electricity from renewable energy source is used to supply energy, in particular electricity, to the one or more energy consumers of the area. Preferably, the generated electricity from renewable energy source is used to supply energy, in particular electricity, to the hybrid power plant. Generated electricity that is not immediately needed, or is not needed within the next few hours or days, is either routed to reactor 3 and used for thermochemical conversion of biomass into other energy carriers or routed to electrolyzer 10 and used for electrolysis of water to produce hydrogen, or a portion of the excess electricity from renewable energy source is routed to reactor 3 and used for thermochemical conversion of biomass into other energy carriers and a portion of the excess electricity is routed to electrolyzer 10 and used for electrolysis of water to produce hydrogen.

In preferred embodiments, the hybrid power plant comprises a reactor 3 for thermochemical conversion of biomass into gaseous energy carriers, preferably a reactor 3 for thermochemical conversion of biomass into synthesis gas, wherein generated synthesis gas or parts of the generated synthesis gas are used as storable other energy carriers in the hybrid power plant. Preferably, the hybrid power plant comprises at least one gas processing plant 4 for separating individual gaseous components from generated synthesis gas, preferably for separating methane. Corresponding devices and processes are known. Preferably, the hybrid power plant comprises at least one line for synthesis gas 18, wherein the reactor 3 is connected to the gas processing plant 4 via a line for synthesis gas 18.

Preferably, the hybrid power plant comprises lines for biomass 23. In preferred embodiments, the biomass required for the thermochemical conversion is produced by the energy consumer(s) 15 16. In preferred embodiments, the area includes at least one other source of biomass 24, such as storage tanks for biomass or a collection station for biowaste. In these embodiments, the reactor 3 is connected to the energy consumer(s) 15 16 via at least one line for biomass 23, so that the required biomass is transferred from the energy consumer(s) 15 16 through the line for biomass 23 continuously or on demand into the reactor 3 and thermochemically converted into other energy carriers. In specific embodiments, the reactor 3 is connected to the at least one further source of biomass 24 via at least one line for biomass 23, so that required biomass from the at least one further source of biomass 24 is introduced into the reactor 3 continuously or on demand via the line for biomass 23 and thermochemically converted into other energy carriers.

For the thermochemical conversion of the biomass, the electricity generated with the at least one plant for generation of electricity from renewable energy source of the hybrid power plant is preferably used directly, for example, when there is just a particularly large amount of electricity generated from renewable energy source and at the same time little electricity is needed to supply energy to the energy consumer(s) 15 16 of the area, i.e., a surplus of electricity is generated from renewable energy source in the hybrid power plant. For thermochemical conversion of biomass in the reactor 3, electricity generated from renewable energy source can also be used indirectly, for example, when there is just particularly much biomass and particularly much stored energy carrier in the hybrid power plant or just particularly much biomass and little or no electricity is generated from renewable energy source in the hybrid power plant. In the case of indirect use of the electricity from renewable energy source, stored energy carrier previously generated in the hybrid power plant from electricity from renewable energy source is converted back into electricity and used to operate reactor 3 for thermochemical conversion of biomass.

The one or more systems for generating electricity from renewable energy source 1 2 generate electricity in the hybrid power plant when the energy source in question, preferably solar energy, or wind energy, is available. A portion of the generated electricity is used directly to supply energy. The remaining part of the generated electricity (=surplus electricity that is not needed at that time to supply energy to the area that includes one or more energy consumers and the hybrid power plant) is converted into other energy carriers in the hybrid power plant. Preferably, a surplus of electricity is used to operate the hybrid power plant. The hybrid power plant may also be operated by other energy carriers into which surplus electricity from renewable energy source has been converted. Other energy carriers into which surplus electricity has been converted, can replace, or supplement the energy supply of the area and of the energy consumers.

"Other energy carriers" according to the invention are all energy carriers except fossil energy sources and nuclear fuels. "Other energy carriers" according to the invention are all energy carriers into which electricity from renewable energy sources can be converted, for example heat. "Other energy carriers" according to the invention are also energy carriers into which suitable raw materials are converted in PtX devices, where the power-to-X devices are powered by electricity from renewable energy source (directly or indirectly). "Other energy carriers" are for example heat, gaseous energy carriers such as synthesis gas, hydrogen, methane.

With the method according to the invention, by operating the hybrid power plant according to the invention, the energy supply of an area comprising one or more energy consumers 15 16 can be covered at any time of day, night and season, regardless of whether sufficient electricity from renewable energy source can be generated at the relevant time of day, night or season to supply energy to the area comprising one or more energy consumers 15 16 with the one or more plants for generating electricity from renewable energy source 1 2. The total energy supply of an area comprising one or more energy consumers 15 16 is covered exclusively by electricity from renewable energy source at any time of the day, night or season, either directly or indirectly by means of the other energy carriers generated by thermochemical conversion of biomass and electricity from renewable energy source, by means of the hydrogen generated by electrolysis of water and electricity from renewable energy source, and optionally other energy carriers directly or indirectly generated by means of the one or more plants for generating electricity from renewable energy source and optionally converted and optionally stored.

The present invention provides a hybrid power plant that ensures energy supply without the use of fossil energy sources at any time of the day, night or year and any demand. The hybrid power plant according to the invention is an energy generator and at the same time a delocalized energy storage. The hybrid power plant according to the invention enables isolated solutions for supplying energy to an area comprising one or more energy consumers 15 16 without using fossil energy sources.

The area comprising one or more energy consumers 15 16 that is/are autonomously supplied with energy by the hybrid power plant according to the invention can be of different sizes and comprise different types of energy consumers, for example, the energy consumer can be a residential building 15 or a city. This enables rapid implementation of the energy transition and achievement of climate protection goals. The achieved goal of climate neutrality of individual areas, each comprising one or more energy consumers 15 16 is immediately visible and measurable. The construction of nationwide energy carrier-specific transport, storage and logistics infrastructure is not required and therefore does not represent a limiting factor, because existing areas comprising one or more energy consumers 15 16 form energy self-sufficient units with the hybrid power plant. The areas can be independently developed to be energy self-sufficient by adding a hybrid power plant according to the invention to the area. For this reason, the time-delaying clarification of legal, political, and social issues that stand in the way of the development of nationwide infrastructure is also largely eliminated. In the next step, individual energy self-sufficient units can be coupled and thus contribute to a nationwide network of $CO_2$-neutral energy supply. Another object of the invention is a nationwide or nearly nationwide network comprising a plurality of energy self-sufficient units according to the invention.

The hybrid power plant according to the invention for the self-sufficient energy supply of an area comprising one or more energy consumers 15 16, combines plants for the generation of the energy carrier electricity from renewable energy source with PtX devices for the generation of other energy carriers e.g., PtH devices such as heat pumps 11 for the generation of heat from surplus electricity from renewable energy source. The hybrid power plant according to the invention combines, for the self-sufficient energy supply of an area, plants for the generation of electricity from renewable energy source with PtX devices for the thermochemical conversion of biomass into other energy carriers, in particular suitable reactors 3. Various other energy carriers can be produced from biomass by thermochemical conversion with PtX devices/reactors 3. Corresponding devices/reactors 3 and thermochemical processes are known to a person skilled in the art, for example biogas plants for the conversion of biomass into biogas. In particularly preferred embodiments of the hybrid power plant, the PtX device or reactor 3 for thermochemical conversion of biomass is a PtG device that converts biomass into synthesis gas, for example biogas. The hybrid power plant comprises a PtX device, preferably a reactor 3 for thermochemical conversion of biomass into other energy carriers, for example selected from devices or reactors 3 for combustion of biomass or pyrolysis of biomass or biogas plants. In this context, the biogas or synthesis gas produced during the thermochemical conversion, especially the hydrothermal conversion of biomass, is generally a gas mixture which may contain different gases and different amounts of the respective gases. The composition of the generated biogas or synthesis gas depends on the respective reaction conditions of the thermochemical or hydrothermal conversion and may vary within wide limits. The reaction conditions of the thermochemical or hydrothermal conversion, such as, for example, pressure, temperature, dwell time, shape, and arrangement of the reaction chambers in the PtX device, in particular the reactor 3, any catalysts used, the exclusion of oxygen during the conversion or the presence of oxygen during the conversion, the composition of the biomass and other factors have an influence on the composition. Depending on the respective demand and the respective conditions, a suitable hybrid power plant or a PtX device, in particular reactor 3, suitable for this area can be selected for each area.

In preferred embodiments of the hybrid power plant and the method according to the invention, the thermochemical conversion of biomass is a hydrothermal conversion of biomass, wherein the hybrid power plant comprises a PtX device, preferably PtG device, in particular a reactor 3 for hydrothermal conversion of biomass. Preferably, the reactor is selected from reactor 3 for hydrothermal carbonization of biomass, reactor 3 for hydrothermal liquefaction of biomass, reactor 3 for hydrothermal gasification of biomass, reactor 3 for subcritical hydrothermal gasification of biomass, reactor 3 for near-critical hydrothermal gasification of biomass, reactor 3 for supercritical hydrothermal gasification of biomass in the absence of oxygen. With PtX devices, in particular reactors 3 for hydrothermal conversion of biomass, biomass that is in the form of an aqueous solution or that is produced by dilution or mixing with water is converted into other energy carriers under elevated temperature and pressure. In this process, the water is a solvent for solid components of the biomass, a reactant of the hydrothermal conversion and, if necessary, is involved in the hydrothermal conversion of the biomass as a catalyst. The various hydrothermal processes are known, they differ in terms of pressure and temperature, so that biomass is either hydrothermally carbonized, liquefied, or gasified. The respective reactor 3 must be suitable for the hydrothermal conversion in question. For example, in hydrothermal carbonization of biomass in a reactor 3 for hydrothermal carbonization, biomass is converted into coal slurry or coal-like solid as an energy carrier. In the hydrothermal liquefaction of biomass in a reactor 3 for hydrothermal liquefaction, biomass is converted, for example, into a high-viscosity tar as an energy carrier, wherein the produced high-viscosity tar can be used as a fuel or carbon-supplying raw material to produce carbon-containing materials, carbon-containing chemicals, and carbon-containing fuels.

In the hydrothermal gasification of biomass, biomass is converted into synthesis gas (=other energy carrier) in a reactor 3 for hydrothermal gasification. Depending on the reaction conditions of the hydrothermal gasification, such as pressure, temperature, presence or absence of catalysts, possibly type of catalyst(s), flow rate of the biomass, structural details of the reactor 3, installations and arrangement of installations in the reactor 3, composition of the biomass, possibly separation of solids or other fractions from the biomass, if applicable point in time and type of separation of solids or other fractions from the biomass, etc., the synthesis gas produced has a different composition. In subcritical hydrothermal gasification of biomass in a reactor 3 for subcritical hydrothermal gasification, biomass is converted in the presence of noble metal catalysts, for example, into synthesis gas, which preferably comprises hydrogen. In near-critical hydrothermal gasification of biomass in a reactor 3 for near-critical hydrothermal gasification, biomass is converted in the presence of catalysts, for example, into synthesis gas, which preferably comprises methane. In the supercritical hydrothermal gasification of biomass under exclusion of oxygen in a reactor 3 for supercritical hydrothermal gasification, biomass is preferably converted into synthesis gas, which essentially comprises hydrogen, methane, and carbon. A reactor 3 for supercritical hydrothermal gasification of biomass under oxygen exclusion must meet special requirements e.g., be temperature-resistant up to at least 700 degrees Celsius, pressure-resistant up to at least 25 MPa and corrosion-resistant and be suitable in terms of the structure and arrangement of the installations for the supercritical hydrothermal gasification of biomass under oxygen exclusion. In this case, the conversion of the biomass can take place, for example, continuously or as required. During the thermochemical, especially the hydrothermal conversion of biomass, biomass is preferably converted into heat and synthesis gas.

In preferred embodiments of the invention, the hybrid power plant comprises as reactor 3 for thermochemical conversion of biomass into other energy carriers 3 a reactor 3 for supercritical hydrothermal gasification of biomass, preferably a reactor 3 for supercritical hydrothermal gasification of biomass in the absence of oxygen.

It is an object of the invention to provide a hybrid power plant for self-sufficient power supply to an area, comprising one or more energy consumers 15 16 and one or more sources of biomass 24, comprising, at least one plant for generation of electricity from renewable energy source 1 2, at least one electrolyzer 10 to produce hydrogen, a reactor 3 for supercritical hydrothermal gasification of biomass in the absence of oxygen, at least one storage for storing energy carriers 6 7 9, at least one plant for recovery of electricity from stored energy carriers 13 14, wherein at least one plant for generation of electricity from renewable energy source 1 2 is connected to the one energy consumer of the area for supplying energy to the energy consumer 15 16, or wherein at least one plant for generation of electricity from renewable energy source 1 2 is connected to the plurality of energy consumers 15 16 of the area for supplying energy to the energy consumers 15 16, wherein at least one plant for generation of electricity from renewable energy source 1 2 is used to convert the electricity from renewable energy source into hydrogen as an energy carrier, wherein at least one plant for generation of electricity from renewable energy source 1 2 is connected to the at least one electrolyzer 10 for converting the electricity from renewable energy source into hydrogen as an energy carrier, and wherein at least one plant for generating electricity from renewable energy source 1 2 with a reactor 3 for supercritical hydrothermal gasification of biomass under oxygen exclusion for converting the electricity from renewable energy source and biomass into the other energy carrier synthesis gas, wherein preferably at least one energy consumer 15 16 of the area produces biomass and is a source of biomass 24, or the area comprises at least one other source of biomass 24 and is a source of biomass 24, or at least one energy consumer 15 16 of the area produces biomass is a source of biomass 24 and the area comprises at least one other source of biomass 24 is a source of biomass 24 (i.e., the area comprises at least two sources of biomass 24), and wherein the reactor 3 is connected to the at least one energy consumer 15 16 of the area producing biomass, or the reactor 3 is connected to the other source of biomass 24, or the reactor 3 is connected to the at least one energy consumer 15 16 of the area producing biomass and to the other source of biomass 24, and wherein the reactor 3 is connected to at least one storage for storing energy carriers for storing the synthesis gas generated or for storing parts of the synthesis gas generated. The generated synthesis gas, preferably parts of the generated synthesis gas, in particular methane contained in the synthesis gas is stored and, if necessary, generated hydrogen or parts of the generated hydrogen and, if required, used for the self-sufficient energy supply of the area and the energy consumer(s) 1516 of the area. Suitable reactors 3 for supercritical hydrothermal gasification of biomass in the absence of oxygen are described in WO 2019/020209 (PCT/EP2018/000355), EP20186443.6 and PCT/EP2021/069848. In particularly preferred embodiments, the hybrid power plant comprises a reactor 3 for supercritical hydrothermal gasification of biomass in the absence of oxygen, for example a reactor 3 described in PCT/EP2018/000355 or EP20186443.6 or PCT/EP2021/069848. The energy required for compression and heating of the biomass, or the energy required for generation of supercritical water is supplied by the plant for generation of electricity from renewable energy source, directly or indirectly. A corresponding reactor 3 in the hybrid power plant is operated directly or indirectly with the electricity generated from renewable energy source 1 2 to convert biomass into synthesis gas. In particularly preferred embodiments of the hybrid power plant and the method according to the invention, the reactor for supercritical hydrothermal gasification of biomass (i.e. biomass in supercritical water) under oxygen exclusion is preferably a reactor described in PCT/EP2018/000355 or EP20186443.6, particularly preferably a reactor 3 described in PCT/EP2021/069848, which is connected via a line for electricity 17 to at least one plant for generating electricity from renewable energy source 1 2 of the hybrid power plant and is supplied with energy or operated with generated electricity from renewable energy source, in particular the energy required for heating the reactor and the biomass. In particularly preferred embodiments of the hybrid power plant, the reactor for supercritical hydrothermal gasification of biomass (i.e. biomass in supercritical water) in the absence of oxygen, is a reactor described in PCT/EP2018/000355 or EP20186443.6, in particular a reactor 3 described in PCT/EP2021/069848, which is connected via a line for electricity 17 to a plant for recovery of electricity, for example at least one turbine 13 and/or fuel cell 14, and in this way is indirectly supplied or operated with electricity from renewable energy sources.

An object of the invention is a hybrid power plant for self-sufficient power supply of an area, comprising one or more energy consumers 15 16 and one or more sources of biomass 24, comprising, at least one plant for generation of electricity from renewable energy source 1 2, at least one electrolyzer 10 to produce hydrogen, a PtG device for thermochemical conversion of biomass into other energy carriers, preferably a reactor 3 for supercritical hydrothermal conversion of biomass under oxygen exclusion into synthesis gas (=other energy carriers), especially a reactor 3 described in PCT/EP2018/000355, particularly preferably a reactor 3 described in PCT/EP2021/069848, preferably at least one gas processing plant 4 and, if necessary, a plant for mechanization 5, at least one storage for storing energy carriers, at least one plant for recovery of electricity from stored energy carriers 13 14, wherein the at least one plant for generation of electricity from renewable energy source 1 2 is connected to the one or more energy consumers 15 16 of the area for supplying power to the energy consumer 15 16 or for supplying power to the energy consumers 15 16, wherein at least one plant for generating electricity from renewable energy source 1 2 is connected to at least one electrolyzer 10 for converting the electricity from renewable energy source into the energy carrier hydrogen, wherein at least one plant for generation of electricity from renewable energy source 1 2 is connected to the PTG device, preferably the reactor 3 for converting the electricity from renewable energy source into other energy carriers, and wherein the one or more sources of biomass 24 comprised in the area are selected from at least one energy consumer 15 16 of the area that produces biomass, or the area includes at least one other source of biomass 24; or at least one energy consumer 15 16 of the area produces biomass and the area includes at least one other source of biomass 24; and wherein the reactor 3 is connected to the at least one energy consumer 15 16 of the area producing biomass, or the reactor 3 is connected to the at least one other source of biomass 24, or the reactor 3 is connected to the at least one energy consumer 15 16 of the area producing biomass and is connected to the at least one other source of biomass 24.

In the preferred embodiment of the hybrid power plant and method according to the invention, biomass is introduced into reactor 3 and hydrothermal converted into synthesis gas under supercritical conditions and in the absence of oxygen using electricity from renewable energy source, the synthesis gas produced, preferably parts of the synthesis gas produced, especially methane contained in the synthesis gas, is stored in a storage for storing energy carriers. If necessary, generated hydrogen or parts of the generated hydrogen are also stored in a storage for storing energy carriers. Preferably, generated hydrogen is converted with parts of the synthesis gas into other energy carriers, preferably methane. Preferably, stored synthesis gas, stored methane, optionally stored hydrogen, and optionally other stored energy carriers are used, especially converted back into electricity, as required for the self-sufficient energy supply of the area and the energy consumer(s) 15 16 of the area.

In particularly preferred embodiments of the invention, the hybrid power plant comprises one or more energy consumers 15 16 and one or more sources of biomass 24 for self-sufficient power supply to an area, at least one plant for generation of electricity from renewable energy source 1 2, one or more storages for storing energy carriers 6 7 9, preferably at least one electrolyzer 10, at least one plant for recovery of electricity from stored energy carriers 13 14, a reactor 3 for supercritical hydrothermal gasification of biomass compressed to 25 to 35 MPa in the absence of oxygen, wherein the reactor 3 comprises a pressure-tight sealable inner shell surrounding a first pressure space, and wherein the reactor 3 in the inner shell comprises, (a) a separation area comprising at least one heat exchanger for heating compressed biomass up to 550 degrees Celsius and comprising at least one separator for separating solid substances, metal salts, phosphate and ammonium, if contained in the compressed biomass, from the compressed biomass, and (b) a heating area for heating the compressed biomass after separation according to (a) to 600 to 700 degrees Celsius comprising a line for synthesis gas, and (c) a dwell area for supercritical hydrothermal gasification of the compressed biomass after heating to 600 to 700 degrees Celsius comprising the line for synthesis gas, wherein preferably the separation area, heating area and dwell area are arranged in the reactor 3 as an upright column, and wherein the reactor 3 comprises an outer shell surrounding the inner shell and comprises a second pressure space between the inner shell and the outer shell, wherein the line for synthesis gas forms an annular gap with the inner shell in part of the heating area or in the entire heating area, and the annular gap in the heating area at least partially has a diameter of less than 30 mm, wherein one or more heating elements are arranged in the second pressure space in the area surrounding the annular gap in the heating area for heating the compressed biomass in the heating region to 600 to 700 degrees Celsius, and wherein the one plant for generation of electricity from renewable energy source 1 2 is connected to the heating element or elements in the second pressure space or wherein, if present, the plurality of plants for generation of electricity from renewable energy source 1 2 are connected to the heating element or elements in the second pressure space and the heating element or elements can be heated with the electricity generated by renewable energy source. Thereby, preferably the at least one plant for generation of electricity from renewable energy source 1 2 is connected to the one energy consumer or the plurality of energy consumers 15 16 of the area for supplying energy to the energy consumer 15 16 or for supplying energy to the energy consumers 15 16. Thereby, preferably the at least one plant for generation of electricity from renewable energy source 1 2 is connected to at least one electrolyzer 10 for converting the electricity from renewable energy source into the energy carrier hydrogen. Thereby, the at least one plant for generating electricity from renewable energy source 1 2 for converting the electricity from renewable energy source into other energy carriers is connected to the reactor 3 and wherein the reactor 3 is connected to the at least one gas processing plant 4 and wherein the reactor 3 is optionally connected to at least one storage for storing energy carriers. Preferably, the electrolyzer 10 is connected to at least one storage for storing energy carriers and preferably to the gas processing plant 4 and optionally connected to a plant for mechanization 5. With this embodiment of the hybrid power plant, biomass can be introduced into reactor 3 and converted into synthesis gas hydrothermally under supercritical conditions and in the absence of oxygen using electricity from renewable energy sources. The produced synthesis gas, preferably parts of the produced synthesis gas, in particular methane contained in the synthesis gas can be separated and stored and produced hydrogen or parts of the produced hydrogen can be stored and, if necessary, produced hydrogen can be converted with parts of the synthesis gas into other energy carriers. Stored synthesis gas, stored methane, stored hydrogen, if any, and other stored energy carriers, if any, may be used to provide a self-sufficient energy supply to the area and to the energy consumer(s) 15 16 of the area, if needed.

In particularly preferred embodiments, the area includes a source of biomass 24 used as raw material for converting electricity from renewable energy source to other energy carriers. Preferably, the source of biomass 24 is present or generated in the respective area and/or the energy consumer(s) 15 16 of the area. Examples of a source of biomass 24 are organic waste such as biowaste and sewage sludge present or generated in the area that is self-sufficiently supplied with energy by the hybrid power plant according to the invention, for example by the residents of a residential building 15 or employees of an industrial plant. As a result, biomass that is no longer needed in the area or that is no longer needed by the energy consumer(s) 15 16 is converted in the hybrid power plant according to the invention into one or more other energy carriers that can be used, for example, to supply energy if no or insufficient electricity can be generated by the plant for generation of electricity from renewable energy source 1 2 to supply the area, the energy consumer(s) 15 16 or the energy self-sufficient unit with energy in a self-sufficient manner. The hybrid power plant according to the invention implements the principle of sector coupling as a stand-alone solution in the energy self-sufficient unit, thereby enabling the energy supply of the energy self-sufficient unit or area and the energy consumer(s) 15 16 comprised in the area to be completely independent of fossil energy sources and electricity from nuclear fuels. The conversion of on-site or existing biomass and generated excess electricity from renewable energy source 1 2 into other energy carriers that can cost-effectively and efficiently be stored and converted back into electricity when needed or used directly to supply energy, enables self-sufficient energy supply. The conversion and storage of surplus electricity generated locally, on site with plant for generation of electricity from renewable energy source 1 2, reduces the cost of storage and transportation of surplus generated electricity from renewable energy sources and at the same time reduces the cost of storage, transportation, and disposal of biomass. Only the investment costs to acquire and construct the hybrid power plant and maintenance costs of the hybrid power plant are incurred.

In preferred embodiments, the hybrid power plant comprises a reactor 3 for thermochemical conversion, preferably hydrothermal conversion of biomass into a reaction product consisting of synthesis gas or comprising synthesis gas. The synthesis gas produced comprises one or more components selected from water, $CO_2$, CO, $H_2$, $CH_4$, low molecular weight hydrocarbons (low molecular weight=1 to 4 carbon atoms). In preferred embodiments, the hybrid power plant comprises a reactor 3 for converting biomass into synthesis gas and optionally other energy carriers (e.g., heat) wherein the synthesis gas produced comprises substantially, preferably at least 80% by volume, preferably at least 90% by volume water, $CO_2$, CO, $H_2$ and $CH_4$. In particularly preferred embodiments, the hybrid power plant comprises a reactor 3 for supercritical hydrothermal gasification of biomass in supercritical water in the absence of oxygen, preferably a reactor 3 described in EP20186443.6 or PCT/EP2021/069848, wherein the synthesis gas produced substantially comprises $H_2$, $CO_2$ and $CH_4$, respectively, wherein the synthesis gas produced comprises, for example, at least 90 vol %, preferably at least 95 vol % or more of $H_2$, $CO_2$ and $CH_4$. The synthesis gas obtained by supercritical hydrothermal gasification of biomass in the absence of oxygen is preferably dissolved in supercritical water. In the preferred embodiments of the hybrid power plant described, biomass is converted into the energy carriers $H_2$, $CO_2$ and $CH_4$.

$H_2$ and $CH_4$ are energy carriers that can be used directly, for example $H_2$ to power hydrogen vehicles. $H_2$ and $CH_4$ are energy carriers that can be stored and converted into other energy carriers. The conversion by the hybrid power plant of biomass and electricity from renewable energy source into the energy carriers $H_2$ and $CH_4$ contributes significantly to the self-sufficient energy supply of the area that comprises one or more energy consumers 15 16. In the hybrid power plant or the energy self-sufficient unit according to the invention, PtG devices for thermochemical conversion of biomass are therefore preferred, in which predominantly $H_2$ and $CH_4$ are generated.

The hybrid power plant according to the invention comprises one or more storages for storing energy carriers 6 7 9 (hereinafter also referred to as "energy storages"). In preferred embodiments, the hybrid power plant comprises two to 20, preferably three, four, five or more storages for storing energy carriers. The energy storages may be the same or different, preferably the hybrid power plant comprises at least two, preferably three different storages for storing energy carriers. In preferred embodiments, the hybrid power plant comprises as energy storage one or more gas storages, for example compressed gas storages such as low-pressure gas storages, medium-pressure gas storages, high-pressure gas storages, preferably medium-pressure storages. Medium-pressure storages save gases at a pressure of 40 to 100 bar. In individual embodiments, the hybrid power plant comprises an energy storage for the generated syngas (=syn-storage), preferably the syn-storage is a compressed gas storage. In preferred embodiments, the hybrid power plant comprises at least one energy storage for hydrogen (=$H_2$ storage) 6, preferably one or more $H_2$-compressed gas storages, particularly preferably one or more $H_2$-medium-pressure storages. In further preferred embodiments, the hybrid power plant comprises at least one energy storage for methane (=$CH_4$ storage) 7 preferably one or more $CH_4$-compressed gas storages. In particularly preferred embodiments, the hybrid power plant comprises at least one $H_2$-storage 6 and at least one $CH_4$-storage 7, preferably $H_2$-storage 6 and $CH_4$-storage 7 are compressed gas storages.

The energy carriers $CH_4$ and $H_2$ are particularly suitable for the storage of energy, as a supply of energy for a time when the energy supply of the area comprising one or more energy consumers 15 16 cannot be covered or cannot be covered sufficiently by one or more plants for the generation of electricity from renewable energy source 1 2. Due to their different properties, $CH_4$ and $H_2$ are particularly suitable for storing energy for complementary periods of different lengths. Due to the higher energy density of $CH_4$ ($CH_4$ has only about ⅓ of the geometric volume compared to $H_2$ for the same energy density), the storage of $CH_4$ is suitable as an energy carrier-long-term storage, for example, an energy carrier-stock can be created in the summer to supplement the generation of electricity from a renewable energy source such as solar, in the winter to ensure the self-sufficient energy supply of the area comprising one or more energy consumers 15 16 or the energy self-sufficient unit also in the winter. The $CH_4$-storage 7 is therefore suitable as a seasonal storage unit. With the energy carrier $CH_4$ from the $CH_4$-storage 7, preferably the $CH_4$-compressed gas storage, the energy supply of the area comprising one or more energy consumers 15 16 or of the energy self-sufficient unit can be ensured over long periods of time such as weeks and months. In particularly preferred embodiments, the hybrid power plant comprises at least one $CH_4$-storage 7, preferably at least one $CH_4$-compressed gas storage as long-term storage or seasonal storage.

In particularly preferred embodiments, the hybrid power plant comprises at least one $H_2$-storage 6, preferably at least one $H_2$-medium-pressure storage as a medium time storage for storing the energy carrier $H_2$ for hours to weeks, for example 1 to 24 hours, 1 or several days. Due to the lower energy density of $H_2$ compared to $CH_4$, a larger geometric volume of the energy carrier $H_2$ is required for storing the same amount of energy than for storing the same amount of energy $CH_4$. In preferred embodiments of the hybrid power plant, $H_2$ not needed immediately, or the near future is therefore converted to $CH_4$ and stored in the $CH_4$-storage 7 preferably a $CH_4$-compressed gas storage. In preferred embodiments, the hybrid power plant comprises means for converting $H_2$ to $CH_4$. Means for the conversion of $H_2$ into $CH_4$ are preferably plants for methanization 5, which convert hydrogen and carbon dioxide into methane ($4H_2+CO_2=CH_4$). By means of the plants for methanization 5, $H_2$ not required e.g., from the $H_2$-storage 6 or medium-term storage or $H_2$ not required for mobility can be converted into $CH_4$ for long-term storage.

In particularly preferred embodiments, the hybrid power plant comprises at least one gas processing plant 4. Preferably, the at least one gas processing plant 4 comprises means for separating synthesis gas into the different gases contained in the synthesis gas or means for separating individual gases. Preferably, the hybrid power plant comprises at least one gas processing unit 4 comprising means for separating $H_2$ from the synthesis gas. Preferably, the hybrid power plant comprises at least one gas treatment plant 4 comprising means for separating $CH_4$ from the synthesis gas. Preferably comprises the hybrid power plant at least one gas treatment plant 4 comprising means for separating $CO_2$ from the synthesis gas. Corresponding gas treatment plants 4 and means for separating synthesis gas or for separating individual gases are known, for example membrane plants, adsorption plants.

In preferred embodiments of the hybrid power plant, the gas treatment plant 4 comprises means for converting $CO_2$ to $CH_4$, preferably at least one plant for methanization 5. In particularly preferred embodiments, the hybrid power plant comprises a reactor 3 for hydrothermal conversion of biomass into other energy carriers, in particular a reactor 3 for supercritical hydrothermal gasification of biomass in the absence of oxygen, at least one gas treatment plant 4 comprising means for separating individual gases from the synthesis gas produced, preferably means for separating $H_2$, means for separating $CH_4$ and at least one plant for methanization 5. In particularly preferred embodiments, the hybrid power plant comprises a reactor 3 for supercritical hydrothermal gasification of biomass in the absence of oxygen, at least one gas treatment plant 4 with means for separating individual gases from the synthesis gas produced, preferably means for separating $H_2$, and means for separating $CH_4$ and at least one plant for methanization 5 and at least two storages for storing energy carriers, preferably an $H_2$-storage 6 and a $CH_4$-storage 7.

In preferred embodiments, the hybrid power plant comprises a reactor 3 for hydrothermal conversion of biomass into other energy carriers, in particular a reactor 3 for supercritical hydrothermal gasification of biomass in the absence of oxygen to generate synthesis gas, the reactor 3 being connected to at least one gas processing plant 4 via a line for synthesis gas 18. In preferred embodiments, the hybrid power plant comprises at least one gas processing plant 4, at least one $H_2$-storage 6 and a line for $H_2$ 20, wherein the gas processing plant 4 is connected to the $H_2$-storage 6 via the line for $H_2$ 20. In preferred embodiments, the hybrid power plant comprises at least one gas processing plant 4, at least one $CH_4$-storage 7 and a line for $CH_4$ 19, wherein the gas processing plant 4 is connected to the $CH_4$-storage 7 via the line for $CH_4$ 19.

In preferred embodiments, the hybrid power plant comprises further storages for storing energy carriers 6 7 9 e.g., short-term storages for storing energy carriers for seconds and minutes. Suitable short-term storages are, for example, battery 8 for storing generated electricity from renewable energy sources 1 2, accumulator, oscillating wheel. In preferred embodiments, the hybrid power plant comprises at least one battery 8 as short-term storage, wherein the battery 8 is connected via line for electricity 17 to the PtX device(s), in particular the reactor 3, possibly the electrolyzer 10 and possibly the one or more energy consumers 15 16 of the area.

A preferred embodiment the hybrid power plant comprises,

- at least one plant for generation of electricity from renewable energy source 1 2,
- at least one electrolyzer 10 to produce hydrogen,
- at least one source of biomass 24,
- at least one PtG device for thermochemical conversion of biomass into synthesis gas, preferably a reactor 3 for supercritical hydrothermal conversion of biomass under oxygen exclusion into synthesis gas (=other energy carriers), especially a reactor 3 described in PCT/EP2021/069848,
- at least one gas treatment plant 4 comprising means for separating $H_2$ from the synthesis gas produced and comprising means for separating $CH_4$ from the synthesis gas produced, and optionally at least one methanization plant 5,
- at least three storages for storing three different energy carriers 6 7 9, preferably at least one $H_2$-storage 6 as a medium-term storage, at least one $CH_4$-storage 7 as a long-term storage, at least one short-term storage, for example a battery 8, preferably at least one plant for recovery of electricity from stored energy carriers 13 14, wherein at least one plant for generation of electricity from renewable energy source 1 2 is connected to the one or more energy consumers 15 16 of the area, at least one plant for generation of electricity from renewable energy source 1 2 is connected to at least one electrolyzer 10, and at least one plant for generation of electricity from renewable energy source 1 2 is connected to the reactor 3, and wherein at least one energy consumer 15 16 of the area is producing biomass, the reactor 3 is connected to the at least one energy consumer 15 16 of the area that produces biomass, or the area comprises at least one other source of biomass 24 and the reactor 3 is connected to the other source of biomass 24 comprised in the area, or at least one energy user 15 16 of the area produces biomass and the area includes at least one other source of biomass 24, and the reactor 3 is connected to the at least one energy user 15 16 of the area that produces biomass and to the other source of biomass 24 comprised in the area, and wherein the reactor 3 is connected to a gas processing plant 4 and the gas processing plant 4 for storing hydrogen is connected to the $H_2$-storage 6 via the line for $H_2$ 20 and the gas processing plant 4 for storing methane is connected to the $CH_4$-storage 7 via the line for $CH_4$ 19, wherein the electrolyzer 10 for storing generated hydrogen is connected to the $H_2$-storage 6 via line for $H_2$ 20, wherein the battery 8 for storing generated electricity is connected via line for electricity 17 to at least one plant for generating electricity from renewable energy source 1 2, and wherein at least one plant for generating energy from renewable energy source 1 2 for supplying energy to the reactor 3 is connected to the reactor 3 via line for electricity 17, and wherein preferably the batteries 8 for supplying energy to the reactor 3 are connected to the reactor 3 via line for electricity 17, and wherein at least one $CH_4$-storage 7 and optionally at least one $H_2$-storage 6 is connected to at least one plant for recovery of electricity from stored energy carriers 13 14 to generate electricity from stored energy carriers ($H_2$, $CH_4$), and wherein preferably at least one plant for recovery of electricity from stored energy carriers 13 14 for energy supply of the reactor 3 is connected to the reactor 3 via line for electricity 17, and wherein preferably at least one plant for recovery of electricity from stored energy carriers 13 14 for supplying energy to the energy consumer(s) 15 16 comprised in the area is connected to the energy consumer(s) 15 16 via line for electricity 17.

The hybrid power plant according to the invention uses renewable energy sources to generate electricity. Renewable energy sources include, for example, solar energy, wind power (wind energy), hydroelectric power, biomass, and geothermal energy. To generate electricity from renewable energy source, the hybrid power plant includes at least one plant for generation of electricity from renewable energy source. Electricity from solar energy can be generated e.g., by photovoltaic (PV) plants, electricity from wind energy e.g., by wind power plants, electricity from water e.g., through hydropower plants. Corresponding plants are known. In special embodiments, the hybrid power plant comprises at least two plants for generating electricity from renewable energy source. The hybrid power plant may comprise more than two, e.g., three, four or more plants for generation of electricity from renewable energy source. These plants may use the same or different renewable energy source. In special embodiments, the hybrid power plant comprises at least two different plants for generating electricity from the same renewable energy source. In special embodiments, the hybrid power plant comprises at least two plants for generating electricity from two different renewable energy sources. In preferred embodiments, the hybrid power plant comprises at least two different plants for generating electricity from two different renewable energy sources. For example, the hybrid power plant comprises at least one plant for generating electricity from solar energy 1 and at least one plant for generating electricity from hydropower, or at least one plant for generating electricity from solar energy 1 and at least one plant for generating electricity from wind energy 2, or at least one plant for generating electricity from hydropower and at least one plant for generating electricity from wind energy 2.

In particularly preferred embodiments, the hybrid power plant comprises a plant for generating electricity from solar energy 1 and a plant for generating electricity from wind energy 2. Each plant for generating electricity from renewable energy source in the hybrid power plant may comprise one or more elements for generating electricity from renewable energy source, for example a wind power plant may comprise one or more wind turbines. Corresponding plants for generating electricity from solar energy 1 and for generating electricity from wind energy 2 are known and may be selected depending on the geographic location of the area and the energy consumer(s) 15 16, the amount of energy required to supply the energy demand of the area and the energy consumer(s) 15 16 at certain times.

In preferred embodiments, the hybrid power plant includes two, three, or more PtX devices for converting electricity generated from renewable energy source 1 2 to other energy carriers. This couples the generation of electricity from renewable energy source with the other sectors in the energy self-sufficient unit, i.e., the hybrid power plant and the one or more energy consumers 15 16 of the area. In particularly preferred embodiments, the hybrid power plant includes two, three, or more PtG devices for converting electricity generated from renewable energy source to gas.

In particularly preferred embodiments, the hybrid power plant comprises an electrolyzer 10 for electrolysis of water, preferably a PEM-electrolyzer (PEM=proton exchange membrane) or one or more PEM-electrolysis cell stacks ("PEM Stack"). In particularly preferred embodiments, the hybrid power plant comprises one or more PEM electrolyzers, preferably one or more PEM electrolysis cell stacks for converting water and electricity generated from renewable energy source into $H_2$. The electrolyzer 10 e.g., the PEM electrolyzer or the PEM electrolysis cell stack converts water and generated electricity into the energy carrier $H_2$, whereby generated $H_2$ is used as energy supplier, e.g., for $H_2$-vehicles or can be stored as a stock (e.g., in the $H_2$-medium-pressure storage) or where $H_2$ can be converted into the energy carrier $CH_4$ for long-term storage (methanization).

A preferred embodiment the hybrid power plant comprises, at least one plant for generation of electricity from solar energy 1 and/or at least one plant for generation of electricity from wind energy 2, at least one PtG device for thermochemical conversion of biomass into other energy carriers, preferably a reactor 3 for supercritical hydrothermal conversion of biomass under oxygen exclusion into synthesis gas preferably a reactor 3 described in EP20186443.6, in particular a reactor 3 described in PCT/EP2021/069848, at least one second PtG device for converting electricity from renewable energy source into hydrogen, preferably at least one electrolyzer 10, especially at least one PEM electrolyzer, particularly preferably at least one PEM electrolysis cell stack for the generation of hydrogen, at least one gas processing plant 4, the gas processing plant 4 comprising means for separating $H_2$ from the synthesis gas, means for separating $CH_4$ from the synthesis gas, and a methanization plant 5, several energy storages, wherein at least one energy storage is an $H_2$-storage 6 and at least one energy storage is a $CH_4$-storage 7 and at least one energy storage is a battery 8, wherein the electrolyzer 10 is connected to the $H_2$ storage 6 via a line for $H_2$ 20, wherein the PtG device for thermochemical conversion of biomass into other energy carriers, in particular the reactor 3 is connected to the gas processing plant 4 via a line for synthesis gas 18, wherein the gas processing plant 4, preferably the methanization plant 5 is connected to the $CH_4$ storage 7 via a line for $CH_4$ 19, wherein the battery 8 is connected via a line for electricity 17 to the PtG device for thermochemical conversion of biomass into other energy carriers, in particular the reactor 3, and wherein the battery 8 is connected via line for electricity 17 to the second PtG device, preferably the electrolyzer 10, in particular the PEM electrolyzer, particularly preferably the one or more PEM electrolysis cell stack(s), and wherein the battery 8 is connected via line for electricity 17 to the one or more energy consumers 15 16 of the area.

Other energy carriers, for example methane or a methane-hydrogen mixture, can be reconverted to supply energy to the energy self-sufficient unit or to the one or more energy consumers 15 16 of the area. The hybrid power plant according to the invention preferably comprises one or more plant for recovery of electricity from stored energy carriers 13 14, preferably plants for recovery of electricity from gaseous energy carriers. Corresponding plants for recovery of electricity are known. In preferred embodiments, the hybrid power plant comprises a plant for recovery of electricity from methane or methane-hydrogen mixture. In preferred embodiments, the hybrid power plant comprises gas engine and/or gas turbine 13 and/or fuel cell 14 for recovery of electricity.

In preferred embodiments of the hybrid power plant, electricity from renewable energy source and/or from recovery of electricity from energy carriers, which has been previously generated by the plant for generation of electricity from renewable energy source 1 2 and if necessary has been stored, is used to supply energy to the hybrid power plant, for example for thermochemical conversion of biomass, for example for compression and heating of biomass in reactor 3 and/or to operate the electrolyzer 10. The hybrid power plant may include heat storages 9 for storing generated waste heat from all processes and may include a heat pump 11 for supplying heat, e.g., heating, water heating for the energy consumer(s) 15 16 comprised in the area. The plant(s) for generation of electricity from renewable energy source, PtX device(s), reactor 3, gas processing plant 4, energy storage and plant(s) for recovery of electricity are appropriately arranged and interconnected in the hybrid power plant.

The energy self-sufficient unit may include, in addition to the one or more energy consumers 15 16 of the area, other energy consumers (e.g., refueling stations for e-cars or $H_2$-vehicles) that are powered by electricity or other energy sources generated by the hybrid power plant of the invention.

The hybrid power plant may include a connection to the natural gas network 12, for feed-in of excess $CH_4$ into the natural gas network 12. $CH_4$ generated in the hybrid power plant and not needed to power the energy self-sufficient unit may be feed-in into the natural gas network 12. $CH_4$ produced in the hybrid power plant is biomethane because it is produced exclusively from renewable energy sources. Excess biomethane can also be used as a raw material in the chemical industry. Surplus hydrogen can be used, for example, as fuel for $H_2$-powered vehicles. The hybrid power plant or energy self-sufficient unit may include trailer filling station 25, service tank 26, public tank 27 for this purpose. Surplus electricity from renewable energy source can be fed into the power grid or used as fuel for electricity-powered vehicles (e-car). For this purpose, the hybrid power plant or energy self-sufficient unit may comprise a connection to the power grid and/or electricity-fueling stations. Thus, the hybrid power plant or energy self-sufficient unit according to the invention contributes, beyond the energy supply of the energy consumers 15 16 comprised in the area and the energy supply of the hybrid power plant, to the energy supply and to the implementation of a nationwide energy supply based exclusively on renewable energy sources.

The hybrid power plant is for self-sufficient energy supply preferably located in the vicinity of the area to be supplied that includes one or more energy consumers 15 16.

"Self-sufficient energy supply" means that the energy supply of an area comprising one or more energy consumers 15 16 is fully covered by the hybrid power plant at any time of the day, night, and year. The energy supply of the area that comprises one or more energy consumers 15 16 comprising lighting, heating, cooling, hot water, electricity for various technical devices, for example, household, office, entertainment, and garden equipment. If required, biomass is supplied from outside for self-sufficient energy supply. A supply of biomass may be required if the biomass available in the area or available for disposal is insufficient to fully meet the energy supply at any time of the day, night, or year.

The source of biomass 24 is a reservoir of biomass in the hybrid power plant used as raw material (=educt) in the PtX device for thermochemical conversion of biomass, preferably the PTG device, in particular the reactor 3. The source of biomass 24, may for example include biomass, wherein the biomass is selected from sludge, sewage sludge, biowaste, waste from biogas plants, aqueous organic waste, industrial waste, municipal waste, animal waste, agricultural waste, garden waste, animal meal, vegetable waste, pomace, fly ash, sewage sludge fly ash, food industry waste, drilling muds, digestate, manure, and wastewater such as industrial wastewater. Solid organic waste can also be used as biomass, for example, paper, cardboard, plastics, food scraps, garden waste, and other waste from the organic waste garbage can. Solid organic waste is passed through cutting or shredding equipment and diluted with water or aqueous solutions.

In preferred embodiments, the hybrid power plant according to the invention comprises at least one plant for comminution of solids contained in the biomass. In preferred embodiments, at least one plant for comminution is arranged between the energy consumer 15 16 of the area producing the biomass and the reactor 3.

Preferably, the biomass used as raw material is pumpable. Biomass may need to be diluted before it can be used as educt in reactor 3. Preferably, the biomass, if necessary, after dilution, has a high water content for example at least 80 wt. % water, preferably at least 85 wt. % water, preferably at least 86 wt. %, particularly preferably 87 wt. % to 88 wt. % water.

In preferred embodiments, the hybrid power plant according to the invention comprises at least one plant for dilution of the biomass with water to produce a biomass that is pumpable (i.e., comprises at least 80% water by weight). In preferred embodiments, at least one plant for dilution is arranged between the energy consumer 15 16 of the area producing the biomass and the reactor 3.

A source of biomass 24 may be waste generated in the area, for example biowaste from residents of a residential building 15, or a source of biomass 24 may be present as a stock in the area or may be regrown or supplied from outside, for example (garden) waste, manure from animal stables, or sewage sludge generated in the area or in the vicinity of the area or energy self-sufficient unit. In special embodiments, the source of biomass 24 is supplied with biomass from other areas, e.g., biomass that is generated in other areas and cannot be disposed of or recycled there, such as sewage sludge or manure. In these cases, the hybrid power plant can be operated as a biowaste disposal plant for other areas, which is an additional advantage.

The biomass comprises carbon-containing compounds, for example organic components and/or plastics. The biomass can also contain varying amounts of inorganic components such as sand, metals and heavy metals or metal ions, metal salts, metal oxides, heavy metal ions, heavy metal salts, heavy metal oxides, phosphorus, phosphorus oxide, phosphate, nitrogen, nitrogen oxides, ammonium. These substances are valuable materials. It is advantageous to recover these valuable materials from the biomass. In preferred embodiments, the hybrid power plant comprises a reactor 3 comprising means to separate and recover valuable materials present in the biomass from the biomass before or during hydrothermal gasification. Suitable PtX devices for supercritical hydrothermal gasification in the absence of oxygen are described in EP 3 434 382 B1 and PCT/EP2018/000355, suitable reactors 3 in EP20186443.6 and PCT/EP2021/069848. In the PtX devices and reactors 3 disclosed therein, valuable materials are separated from the biomass compressed to 25 to 35 MPa at temperatures of up to 550 degrees Celsius in one or more fractions, preferably in three fractions, prior to supercritical hydrothermal gasification of the biomass. Preferably, the compressed biomass is first heated to 200 to 300 degrees Celsius, and a fraction is separated in which solids are enriched, then the compressed biomass is heated to 300 to 400 degrees Celsius, and a fraction is separated in which metal salts are enriched, then the compressed biomass is heated to 400 to 550 degrees Celsius, and a fraction is separated in which phosphate and ammonium are enriched. Alternatively, the valuable materials may be separated in one or two fractions or in more than three fractions. In the fraction or fractions separated, valuable materials are enriched e.g., phosphorus as phosphate, nitrogen as ammonium, metals as metal ion salts, silicon as sand. Depending on the embodiment, the valuable materials contained in biomass can be separated in one or more fractions and fed into a recycling process. The hybrid power plant or energy self-sufficient unit may comprise containers for storing valuable materials separated from biomass. A hybrid power plant according to the invention therefore also fulfills the task of recovering valuable materials from biomass.

In particularly preferred embodiments, the hybrid power plant comprises a reactor 3 for supercritical hydrothermal gasification of biomass in the absence of oxygen, wherein compressed biomass is heated to up to 550 degrees Celsius and existing valuable materials are separated prior to supercritical hydrothermal gasification of the biomass in the absence of oxygen. After the separation of valuable materials, the compressed biomass is heated to 600 to 700 degrees Celsius, whereby the biomass is in supercritical water under oxygen exclusion thermochemical gasified to synthesis gas, wherein the synthesis gas produced being dissolved in supercritical water and consisting essentially of methane, hydrogen, and carbon dioxide. Corresponding processes for supercritical hydrothermal gasification of biomass in supercritical water in the absence of oxygen are described in EP 3 434 382 B1 and PCT/EP2018/000355.

For compression of biomass to 25 to 35 MPa, the hybrid power plant according to the invention or the energy self-sufficient unit according to the invention may comprise at least one high-pressure pump. In preferred embodiments, the hybrid power plant according to the invention comprises at least one high-pressure pump for compressing biomass that is pumpable (i.e., comprises at least 80% water by weight) to 25 to 35 MPa. Preferably, at least one high pressure pump is located between the biomass source 24 and the reactor 3. Preferably, at least one high pressure pump is located between the energy consumer 15 16 of the area or the energy consumers 15 16 of the area producing biomass and the reactor 3. In embodiments of the hybrid power plant comprising a plant for dilution, the at least one high pressure pump is preferably arranged between the plant for dilution and the reactor 3. In embodiments of the hybrid power plant comprising a plant for comminution, the at least one high pressure pump is preferably arranged between the plant for comminution and the reactor 3. In embodiments where the area comprises at least one other source of biomass 24, the hybrid power plant preferably comprises at least one other high-pressure pump preferably arranged between the other source of biomass 24 and the reactor 3.

Preferably, the hybrid power plant comprises at least one high-pressure pump for compression of biomass, to 25 to 35 MPa,

- wherein the at least one high pressure pump is arranged between the at least one energy consumer 15 16 of the area producing biomass and the reactor 3 or
- wherein the at least one high pressure pump is located between the other source of biomass 24 comprised in the area and the reactor 3, or
- wherein at least one high pressure pump is located between the energy consumer 15 16 of the area producing biomass and the reactor 3, and wherein at least one high pressure pump is located between the other source of biomass 24 comprised in the area and the reactor 3, or
- wherein the at least one high pressure pump is arranged between the plant for dilution, if any, and the reactor 3, or
- wherein the at least one high-pressure pump is located between the plant for comminution, if any, and the reactor 3.

The hybrid power plant or the energy self-sufficient unit may include other components, for example components mentioned in EP20186443.6 and PCT/EP2021/069848 for corresponding reactors 3 and plants.

The geographical term "area" refers to a spatially (usually) contiguous surface or area on the earth's surface, which can also extend into the third dimension. A "geographical unit" represents a geographical area based on postal units. The area serves as the basis for the spatial structuring of the area that is supplied with energy by the hybrid power plant according to the invention. An area is, for example, a country, state, city, district, street, county, region, district. According to the invention, an area comprises one or more energy consumers. Energy consumers are, for example, one or more buildings (=constructions), e.g. one or more residential buildings 15, e.g. individual houses such as single-family house, multi-family house, semi-detached house, terraced house, high-rise building, and residential building complexes, stores such as shopping areas or shopping centers, sports facilities such as sports stadiums or sports clubs, accommodation buildings such as hotels, vacation resorts, camping site, catering establishments, recreational and amusement parks, administrative buildings, industrial facilities such as manufacturing plants, mines 16, workshops, factory buildings, office buildings, warehouses, agricultural operations such as stables and greenhouses, health care buildings such as hospitals, transport operations such as airports, seaports, railroad station. For the purposes of the present invention, the area may include one or more buildings or structures as energy consumers. For example, the area may comprise collection of residential buildings 15 and/or buildings other than residential buildings 15 for example city, district, street, village, district as energy consumers. The area may include other energy consumers, for example street lighting, pumps for water supply.

One embodiment of the energy self-sufficient unit relates to energy self-sufficient buildings, in particular energy self-sufficient residential buildings 15, wherein the area comprises one or more buildings, for example one residential building 15 or several residential buildings 15 as energy consumers and a hybrid power plant according to the invention for self-sufficient energy supply.

One embodiment of the energy self-sufficient unit relates to an energy self-sufficient village or town, wherein the area comprises a village or town as energy consumer and a hybrid power plant according to the invention for self-sufficient energy supply.

One embodiment of the energy self-sufficient unit relates to an energy self-sufficient industrial plant, the field comprising an industrial plant such as a mine 16 as energy consumer and a hybrid power plant according to the invention for self-sufficient energy supply.

In this case, the self-sufficient energy supply by electricity from renewable energy sources is achieved by sector coupling of the individual devices, reactor 3 and plants in the hybrid power plant and the connection of the hybrid power plant with the energy consumer(s) 15 16 comprised in the area. The plant(s) for generation of electricity from renewable energy source(s) and the energy consumer(s) comprised in the area are coupled to exchange energy carriers. The plant(s) for generation of electricity from renewable energy source and the PtX devices are coupled to each other, for example, the plant for generation of electricity from renewable energy source is coupled to a heat pump 11, to the PtX device for thermochemical conversion of biomass into other energy carriers, in particular the reactor 3, to the PtG device, in particular the electrolyzer 10 for conversion of electricity from renewable energy source into hydrogen. Preferably, the PtX devices in the energy self-sufficient unit are coupled to each other for converting generated and stored energy carriers into each other and to be able to use the energy carriers for energy supply at different locations of the hybrid power plant and for each energy consumer of the area and the energy self-sufficient unit. Preferably, the energy storages are coupled to each other, to the PtX devices, and if present, to the plant for recovery of electricity from stored energy carriers. Plants for generation of electricity from renewable energy sources, PtX devices, and heat pumps 11 if present, are coupled to the geographic unit. Further couplings are possible and can be individually designed. Corresponding couplings and PtX devices are known to the skilled person.

The hybrid power plant can ensure the base load energy of the energy consumer(s) of the area or energy self-sufficient unit. Base load is defined as the load on the power network that is not undercut during a day. The base load therefore depends on the day of consideration (e.g., seasonal variations), the area and the energy consumers comprised (e.g., size of the residential building 15 or industrial plant), the utilization rate of the PtX devices, and so on.

With the hybrid power plant, the energy consumer(s) of the area or the energy self-sufficient unit can also be supplied with energy according to demand. The demand-adapted supply of the energy self-sufficient unit is carried out via the combination of electricity from renewable energy sources and, if necessary, the supplementation by stored energy sources (coupling), e.g., recovery of electricity from the stored methane or a methane-hydrogen mixture. In this way, a sufficient and self-sufficient energy supply to the energy consumer(s) of the area or energy self-sufficient unit can be ensured even during consumption peaks.

Special advantages of the invention are the independence of the energy supply of the relevant energy consumers of the area or the energy self-sufficient unit from fossil energy sources and energy from nuclear power. As a result, small and large energy self-sufficient island solutions are possible e.g., energy self-sufficient buildings, energy self-sufficient apartments, energy self-sufficient industrial plants, energy self-sufficient villages and energy self-sufficient cities. Energy costs can be kept stable. Likewise, disposal costs can be kept stable. The complete recovery and conversion or use of biomass makes the hybrid power plant particularly environmentally friendly. Another advantage is the low logistical requirements. The energy is used, converted, stored and, if necessary, reconverted to electricity where it is generated. This also minimizes energy losses due to long transport routes.

The hybrid power plant or the energy self-sufficient unit can be controlled, for example, via an energy management system based on consumption data.

One or more parts of the hybrid power plant may be arranged in containers. In this way, the hybrid power plant can be delivered turnkey and, for example, placed in the vicinity of existing areas comprising one or more energy consumers 15 16 for energy supply and coupled with the energy consumer(s) of the area or in the vicinity of newly developed areas.

FIG. 1 shows an energy self-sufficient mine 16 (=energy self-sufficient unit) comprising a hybrid power plant according to the invention and a mine 16 as energy consumer. The energy self-sufficient mine 16 comprises a container for storing biomass 24, the container being connected via a line for biomass 23 with the PtX device for thermochemical conversion of biomass into other energy sources. The hybrid power plant according to the invention for the self-sufficient energy supply of the mine 16 comprises a plant for the generation of electricity from solar energy 1 (=photovoltaic plant) and a plant for the generation of electricity from wind energy 2 (=several wind turbines), reactor 3, electrolyzer 10, gas treatment plant 4, $H_2$-storage 6, $CH_4$-storage 7, battery 8, two gas turbines 13. The plant for generation of electricity from solar energy 1 and the plant for generation of electricity from wind energy 2 are connected to the mine 16, reactor 3, electrolyzer 10, turbines 13 by lines for electricity 17. The reactor 3 is connected to the gas processing plant 4 via a line for synthesis gas 18. $H_2$-storage 6 is connected to gas treatment plant 4 and electrolyzer 10 via lines for hydrogen 20. $CH_4$-storage 7 is connected to gas treatment plant 4, gas turbines 13 and natural gas network 12 via lines for methane 19. The plant for generation of electricity from solar energy 1, plant for generation of electricity from wind energy 2, gas turbines 13, battery 8 provide electricity for operation of the hybrid power plant and self-sufficient power supply of the mine 16. Sector coupling is performed by conversion of electricity from renewable energy source solar and wind to other energy carriers in the PtX devices electrolyzer 10, reactor 3, gas turbines 13. Short-term storage of energy carriers is in the form of electricity through the battery 8, medium-term storage is in the form of hydrogen through the $H_2$-storage 6, long-term storage is in the form of methane through the $CH_4$-storage 7. For sector coupling in the hybrid power plant the storages are interconnected by suitable lines, namely lines for gas and lines for electricity 17. The hybrid power plant is connected to the mine 16 by lines for electricity 17. The energy self-sufficient mine 16 includes trailer filling station 25, service tank 26 and public tank 27 for hydrogen-powered vehicles, which are connected to the hybrid power plant via lines for hydrogen 20.

Figure 2:
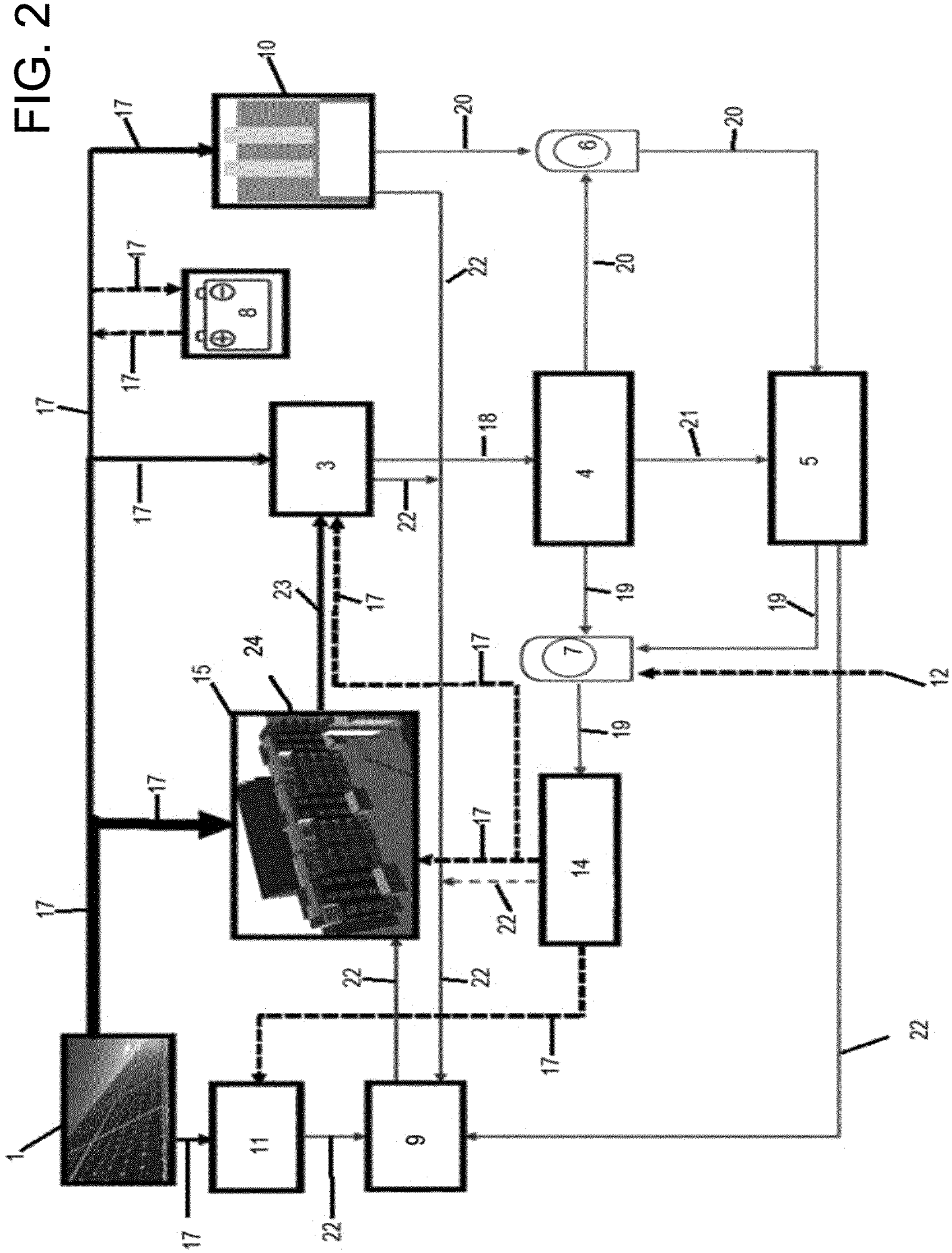

FIG. 2 shows an energy self-sufficient residential building 15 (=energy self-sufficient unit) comprising a hybrid power plant according to the invention and a residential building 15 as energy consumer. The hybrid power plant according to the invention for the self-sufficient energy supply of the residential building 15 comprises a plant for the generation of electricity from solar energy 1 (=PV plant), reactor 3, electrolyzer 10, gas treatment plant 4, plant for methanization 5, $H_2$-storage 6, an $CH_4$-storage 7, heat storage 9, battery 8, fuel cell 14, heat pump 11. The plant for generating electricity from solar energy 1 is connected to the residential building 15, reactor 3, electrolyzer 10, heat pump 11 via lines for electricity 17. The reactor 3 is connected to the gas processing plant 4 via a line for synthesis gas 18. $H_2$-storage 6 is connected to gas processing plant 4, plant for methanization 5, electrolyzer 10 via lines for hydrogen 20. The $CH_4$-storage 7 is connected to gas processing plant 4, plant for methanization 5, fuel cell 14 and natural gas network 12 via lines for methane 19. The plant for generation of electricity from solar energy 1, fuel cell 14, battery 8 provide electricity for operation of the hybrid power plant and self-sufficient energy supply of the residential building 15. Sector coupling is carried out by conversion of electricity from renewable energy source sun into other energy carriers in electrolyzer 10, reactor 3, fuel cell 14. Short-term storage of energy carriers is in the form of electricity through battery 8, medium-term storage is in the form of hydrogen through $H_2$-storage 6, long-term storage is in the form of methane through $CH_4$-storage 7. For sector coupling, in the hybrid power plant the energy storage devices are interconnected by suitable lines, namely lines for gas and lines for electricity 17. The hybrid power plant is connected to the residential building 15 by lines for electricity 17 and lines for heat 22. The hybrid power plant includes a heat storage 9 connected by lines for heat 22 to reactor 3, electrolyzer 10, plant for methanization 5, heat pump 11, to use as much as possible the waste heat generated during conversion to other energy carriers. The heat storage 9 is connected to the residential building 15, so that the heat from the heat storage 9 can be used, for example, for heating the residential building and/or for heating water. The residential building 15 is connected to the reactor 3 via a line for biomass 23.

EXAMPLE 1: ENERGY SELF-SUFFICIENT UNIT COMPRISING A MINE 16

This example concerns an energy self-sufficient unit comprising a mine 16 as a geographical unit and a hybrid power plant for self-sufficient energy supply to the mine 16. The energy-intensive operation of a conventional mine 16 leads to high energy costs. In addition, the ongoing amendments to EU emissions legislation are leading to ever lower limits for NOx- and $CO_2$-emissions, also for mines 16. The purchase of lower-emission or zero-emission vehicles for mines 16 is expensive.

The demand for energy supply of the mine 16 is about 14 GWh per year with a base load of about 900 kW and a peak load of about 2,800 kW. With two wind energy plants and one photovoltaic plant, the mine 16 cannot be supplied with energy continuously and according to demand. Due to wind and dark periods (no wind and no sun), it is necessary to add fossil energy sources in every scenario in which only electricity from renewable energy sources wind and sun is generated as an energy source for mine 16, to guarantee the energy supply at all times of the day, night and year.

A hybrid power plant according to the invention can supply the mine 16 with energy autonomously, with the energy coming only from renewable energy sources. This makes the mine 16 independent of the consumption of fossil energy sources and climate neutral. The hybrid power plant for the self-sufficient energy supply of the mine 16 comprises two plants for the generation of electricity from wind energy 2 (two wind turbines) and one plant for the generation of electricity from solar energy 1 (photovoltaic plant), reactor 3, electrolyzer 10, gas treatment plant 4 comprising means for separating generated synthesis gas into $H_2$, $CO_2$ and $CH_4$ and comprising a plant for methanization 5, several energy storages comprising a $CH_4$-storage 7 as a long-term storage, a hydrogen storage 6 as a medium-term storage, a battery 8 as a short-term storage, two gas turbines 13 for recovery of electricity from methane.

An existing mine 16, which already includes wind power and photovoltaic facilities, can be supplemented to build the hybrid power plant. By adding a reactor 3 for supercritical hydrothermal gasification of sewage sludge under oxygen exclusion, electrolyzer 10, energy storage, gas processing plant 4, and gas turbines 13 to the existing plant for generating electricity from renewable energy sources, the self-sufficient energy supply of the mine 16 can be ensured even during wind and dark periods. The mine 16 and the hybrid power plant form an energy self-sufficient unit. The energy self-sufficient unit includes a connection to the natural gas network 12 and refueling stations for hydrogen-powered vehicles, such as trailer filling stations 25 and in-mine and public refueling stations for $H_2$-powered vehicles.

FIG. 1 shows a preferred embodiment of the energy self-sufficient mine 16.

The energy self-sufficient mine 16 enables the cost-effective conversion to zero-emission, hydrogen-powered vehicles for the mine 16 since self-supply with hydrogen is possible in the energy self-sufficient unit.

The reactor for supercritical hydrothermal gasification of sewage sludge in the absence of oxygen is also used to recycle sewage sludge. The reactor according to EP20186443.6 and PCT/EP2021/069848 for supercritical hydrothermal gasification of sewage sludge in the absence of oxygen has, for example, a throughput capacity of 37 metric tons of sewage sludge per year. In this process, the energy carrier sewage sludge is converted into the energy carrier synthesis gas and, at the same time, valuable materials or raw materials are recovered from the sewage sludge. The energy self-sufficient mine 16 may include one or more tanks for storing biomass 24 such as sewage sludge.

By generating its own "green" electricity and processing sewage sludge into energy carriers, nutrients, and raw materials in the energy self-sufficient mine 16, costs are reduced, and additional sources of income are tapped. The self-sufficient energy supply of the mine 16 also leads to the elimination of the EEG levy. The price for the self-sufficient energy supply of the mine 16 is stable and long-term energy cost planning is possible. Emissions of $CO_2$ and nitrogen oxides are reduced or avoided. In the energy self-sufficient mine, the vehicle fleet of the mine 16 can be converted to $H_2$-reliant mine vehicles powered by $H_2$ from renewable energy sources (=green hydrogen). The hydrogen can be used to fuel $H_2$-fueled mine vehicles and, if necessary, other $H_2$-fueled vehicles or $H_2$-fueled machines. This leads to a long-term solution to the underground emissions problem. Surplus hydrogen can be sold to third parties via $H_2$-filling stations. For this purpose, the energy self-sufficient mine 16 may include one or more trailer filling stations 25 and/or one or more $H_2$ filling stations.

The hybrid power plant may comprise $CH_4$-storage 7 for produced biomethane ($CH_4$). In a preferred embodiment, the hybrid power plant comprises one or more $CH_4$-storages 7, for example, eight tanks as compressed gas storage with 115 $m^3$ volume per tank for the storage of $CH_4$ with a pressure of up to 80 bar. The 8 tanks store the amount of energy carrier $CH_4$ as a long-term supply, which secures the energy supply of the mine 16 for 5 days.

The hybrid power plant may comprise storages for generated biohydrogen ($H_2$). In a preferred embodiment, the hybrid power plant comprises one or more $H_2$-storages 6, for example eleven tanks as compressed gas storage with 115 $m^3$ volume per tank for storing $H_2$ with a pressure of up to 40 bar. The 11 tanks act as medium-term storage and store the amount of energy carrier $H_2$ needed in the next few hours or days to supply energy to the mine and the vehicle fleet. The tank also stores the hydrogen that will be sold.

For recovery of electricity from stored energy carriers, the hybrid power plant comprises a total of 9 turbines 13, which convert the stored energy carrier $CH_4$ or a mixture of the stored energy carriers $CH_4$ and $H_2$ into the energy carrier electricity as required. The methane produced can also be fed into the natural gas network 12. For this purpose, the energy self-sufficient mine 16 may include one or more pipelines connecting the $CH_4$-storage 7 to the natural gas network 12.

EXAMPLE 2: ENERGY SELF-SUFFICIENT RESIDENTIAL BUILDING 15

This example concerns an area comprising a residential building 15 as energy consumer and a hybrid power plant for self-sufficient energy supply of the residential building 15. The hybrid power plant comprises a plant for generation of electricity from renewable energy source, preferably photovoltaic plant, reactor 3, preferably a reactor 3 according to EP20186443.6, in particular according to and PCT/EP2021/069848 for supercritical hydrothermal gasification of biomass, electrolyzer 10, gas treatment plant 4, fuel cell 14, heat pump 11, four different energy storages namely methane storage 7, hydrogen storage 6, battery 8, heat storage 9. The residential building 15 has 30 apartments and accommodates about 80 residents. The demand for energy supply is about 95,000 kWh per year.

The operating concept of the residential building 15 is based on the energy supply with electricity from a photovoltaic system. The photovoltaic system can generate approx. 118,000 kWh of electricity per year i.e., approx. 25,000 kWh of electricity per year more than is required to supply the residential building 15 with energy. In the months of March to September, more energy is generated with the photovoltaic system than is consumed. (over-coverage). In the months of October to February, on the other hand, the photovoltaic system generates less electricity than is needed in the residential building 15 (shortfall). In addition, most of the electricity is generated at noon, while no electricity is generated in the morning and evening. In the mornings, evenings, at night and in the months of October to February, residential building 15 cannot be sufficiently supplied with energy by electricity from solar energy, although the total electricity generated from solar energy in the year would be sufficient for self-sufficient energy supply.

A hybrid power plant according to the invention can ensure the energy supply of the residential building 15 at all times of the day, night and year and supply the residential building 15 completely and self-sufficiently with energy without using fossil energy sources i.e. energy self-sufficient and climate neutral.

The hybrid power plant for the self-sufficient energy supply of the residential building 15 comprises a plant for the generation of electricity from solar energy 1, a reactor 3 for the supercritical hydrothermal gasification of biomass, which is produced by the residential building 15 or the residents, under exclusion of oxygen, preferably a reactor 3 according to PCT/EP2021/069848, wherein prior to the supercritical hydrothermal gasification the valuable materials contained in the biomass are separated in at least three fractions, a second PtX device namely an electrolyzer 10, a gas treatment plant 4 comprising means for separating produced synthesis gas into $H_2$, $CO_2$ and $CH_4$ and a methanization plant 5, several energy storages comprising a $CH_4$-storage 7 as long term storage, a hydrogen storage 6 as medium term storage, a battery 8 as short term storage, two fuel cells 14 for recovering electricity from methane, means for comminuting carbon-containing waste, and means for diluting carbon-containing waste.

An existing residential building 15, which already includes a photovoltaic system, heat pumps 11, and a heat storage 9, can be added to build the hybrid power plant. By adding a reactor for supercritical hydrothermal gasification of carbon-containing waste in the absence of oxygen, electrolyzer 10, energy storage, gas processing plant 4, and fuel cells 14 to the existing plant for generation of electricity from renewable energy source, the self-sufficient energy supply of the residential building 15 can be ensured even during wind and dark periods. The energy self-sufficient residential building 15 includes a connection to the natural gas network 12 and can comprise refueling stations for hydrogen-powered vehicles. The hydrogen produced can be used to refuel residents' $H_2$-powered vehicles or sold, for example via $H_2$ refueling stations.

In the reactor, preferably carbon-containing waste (=organic waste) of the residents of residential building 15 is used as educt (raw material). The residents' organic waste includes, for example, paper, cardboard, plastics, food scraps, garden waste and other waste from the organic waste garbage can. Each resident produces approximately 300 kg of organic waste per year. The carbon-containing waste is comminuted and diluted with water. For this purpose, the hybrid power plant includes means for comminuting carbon-containing waste and means for diluting the comminuted carbon-containing waste. The comminuted, diluted carbon-containing waste is converted to synthesis gas in reactor 3 under supercritical hydrothermal conditions. In this process, valuable materials and nutrients are separated from the comminuted, diluted carbon-containing waste at a pressure of 25 to 35 MPa and temperatures of up to 550 degrees Celsius and then converted to synthesis gas that is dissolved in supercritical water. The hybrid power plant may include containers for storing the separated valuable materials and nutrients.

The hybrid power plant includes a gas processing plant 4 for separating synthesis gas, which consists mainly of $CH_4$, $H_2$ and $CO_2$, into its individual components. The hybrid power plant includes a tank as a methane storage 7. The methane produced by the gas processing plant, or the methane stored in the tank can be converted back to electricity by the fuel cell 14 if required. The methane is used in the residential building 15 to supply power to the residential building 15, the heat pumps 11, and the reactor when the power generated by the photovoltaic system is insufficient to supply power.

Generated heat that is not immediately required can be stored in a heat storage 9 and used as needed to supply energy, in particular heating and/or hot water, to the residential building 15. Generated waste heat from all processes can also be stored in the heat storage 9 and used to supply heat to the residential building 15. For this purpose, the hybrid power plant comprises a heat storage 9 and an electrically operated heat pump 11. The energy supply of the area that includes the residential building 15 is $CO_2$ neutral. The energy costs are stable. The disposal costs for carbon-containing waste are eliminated.

Surplus electricity from the photovoltaic system is used to operate reactor 3. In addition, generated electricity from the photovoltaic system is used to operate the electrolyzer 10. For this purpose, the hybrid power plant includes an electrolyzer 10 that is powered by electricity from renewable energy and that converts excess electricity into hydrogen. The control of power generation, conversion from one energy carrier to another energy carrier using PtX devices, storage of energy carriers, gas processing, and reverse power generation can be controlled by an energy management system based on consumption data.

In a preferred embodiment, residential building 15, photovoltaic system, reactor 3, gas processing plant 4, electrolyzer 10, fuel cell 14, methane storage 7, hydrogen storage 6, heat pump 11, and heat storage 9 are arranged and interconnected in the energy self-sufficient unit as shown in FIG. 2.

In a preferred embodiment, the hybrid power plant comprises a first container, wherein the first container comprises electrolyzer 10, fuel cell 14, and hydrogen storage 6. For example, the first container has dimensions of 12 m×2.5 m×3 m. Preferably, the hybrid power plant comprises a second container, the second container comprising reactor and gas processing unit 4. For example, the second container has dimensions 12 m×2.5 m×3 m. For example, the methane storage 7 in the hybrid power plant is a tank with dimensions 2.8 m (diameter)×21 m (length). For example, the heat storage 9 in the hybrid power plant is a tank with dimensions 2.8 m (diameter)×21 m (length). In a preferred embodiment, the hybrid power plant comprises a second tank as heat storage 9 with dimensions 2.8 m (diameter)×21 m (length). In a preferred embodiment, the energy self-sufficient unit comprises a tank for storing biomass, in particular organic waste.

LIST OF REFERENCE SIGNS

| Term | Reference |
|---|---|
| Plant for the generation of electricity from solar energy | 1 |
| Plant for the generation of electricity from wind | 2 |
| Reactor | 3 |
| Gas processing plant | 4 |
| Plant for methanization | 5 |
| $H_2$ -storage | 6 |
| $CH_4$ -storage | 7 |
| Battery | 8 |
| Heat storage | 9 |
| Electrolyzer | 10 |
| Heat pump | 11 |
| Natural gas network | 12 |
| Gas turbine | 13 |
| Fuel cell | 14 |
| Residential building | 15 |
| Mine | 16 |
| Line for electricity | 17 |
| Line for synthesis gas | 18 |
| Line for $CH_4$ | 19 |
| Line for $H_2$ | 20 |
| Line for $CO_2$ | 21 |
| Line for heat | 22 |
| Line for biomass | 23 |
| Source of biomass | 24 |
| Trailer filling station | 25 |
| Service tank | 26 |
| Public tank | 27 |

The invention claimed is:

1. A hybrid power plant for $CO_2$-neutral and self-sufficient energy supply of an area comprising one or more energy consumers (15) (16) and one or more sources of biomass (24), comprising one or more plants for the generation of electricity from renewable energy sources (1) (2), at least one electrolyzer (10) for the generation of hydrogen, at least one high-pressure pump for compression of the biomass to 25 to 35 MPa, at least one reactor (3) for supercritical hydrothermal gasification of biomass in the absence of oxygen, wherein biomass is converted into synthesis gas comprising hydrogen, carbon dioxide and methane, at least one gas processing plant (4), at least two storages for storing energy carriers (6) (7) (9), wherein at least one storage is a hydrogen storage (6) and at least one storage is a methane storage (7), at least one plant for recovery of electricity from stored energy carriers (13) (14), wherein at least one of the plants for generation of electricity from renewable energy sources (1) (2) is connected to the one energy consumer (15) (16) of the area for supplying energy to the one energy consumer, or wherein at least one of the plants for generation of electricity from renewable energy source (1) (2) is connected to the multiple energy consumers (15) (16) of the area for supplying energy to the multiple energy consumers, and at least one of the plants for generating electricity from renewable energy sources (1) (2) is connected to the at least one electrolyzer (10) for conversion of electricity generated from renewable energy sources into the energy carrier hydrogen, and wherein at least one of the plants for generation of electricity from renewable energy sources (1) (2) is connected to the reactor (3) for conversion of the biomass and electricity generated from renewable energy sources into synthesis gas, and wherein the reactor (3) is connected to at least one storage for storing energy carriers for storing the synthesis gas produced by conversion of biomass and electricity from renewable energy sources, or for storing parts of the produced synthesis gas, and wherein the source of biomass (24) is selected or, if present, the multiple sources of biomass (24) are selected from at least one energy consumer (15) (16) of the area producing biomass, or at least one other source of biomass (24) comprised in the area, or at least one energy consumer (15) (16) of the area producing biomass and at least one other source of biomass (24) comprised in the area, and wherein the reactor (3) is connected to the at least one energy consumer (15) (16) of the area producing biomass, or the reactor (3) is connected to the at least one other source of biomass (24) comprised in the area, or the reactor (3) is connected to the at least one energy consumer (15) (16) of the area producing biomass and to the at least one other source of biomass (24) comprised in the area, and wherein the high-pressure pump is located between the source of biomass (24) and the reactor (3), and wherein the at least one gas processing plant (4) comprises means for separating hydrogen from the produced synthesis gas and means for separating methane from the synthesis gas, wherein said at least one plant for recovery of electricity from stored energy carrier (13) (14) is connected to the one or more energy consumers (15) (16) comprised in the area and to the reactor (3) for energy supply adapted to demand, where the area's energy supply is independent of fossil energy sources and electricity from nuclear fuels.

2. The hybrid power plant of claim 1, wherein the source of biomass (24), is the biomass that the energy consumer (15) produces, and wherein the reactor (3) is connected to the energy consumer (15), and wherein the energy consumer (15) that the area comprises is a residential building (15).

3. A hybrid power plant according to claim 1, wherein the source of biomass (24) is sewage sludge and the area comprises the source of biomass (24) and wherein the reactor (3) is connected to the source of biomass (24) and wherein the energy consumer that the area comprises is an industrial plant, or a mine (16).

4. A hybrid power plant according to one of claims 1 to 3 comprising at least one plant for dilution of biomass with water and at least one plant for comminution of solids that may be contained in the biomass, wherein the at least one plant for dilution of biomass is located between the at least one energy consumer (15) (16) of the area producing biomass and the reactor (3), or the at least one plant for dilution of biomass is located between the at least one other source of biomass (24) comprised in the area and the reactor (3), or at least one plant for dilution of biomass is located between the energy consumer (15) (16) of the area producing biomass and the reactor (3), and wherein at least one plant for dilution of biomass is located between the at least one other source of biomass (24) comprised in the area and the reactor (3).

5. The hybrid power plant according to claim 1, characterized in that the reactor (3) comprises a pressure-tight sealable inner shell surrounding a first pressure space, and in the inner shell comprises (a) a separating area comprising at least one heat exchanger for heating compressed biomass up to 550 degrees Celsius and at least one separator for separating solid soaps, metal salts, phosphate and ammonium from compressed biomass and (b) a heating area for heating compressed biomass after separation according to (a) to 600 to 700 degrees Celsius comprising a line for synthesis gas, and (c) a dwell area for supercritical hydrothermal gasification of compressed biomass after heating to 600 to 700 degrees Celsius comprising the line for synthesis gas, wherein the separation area, heating area and dwell area are arranged in the reactor (3) as an upright column, and wherein the reactor (3) comprises an outer shell surrounding the inner shell and comprises a second pressure space between the inner shell and the outer shell, wherein the line for synthesis gas forms an annular gap with the inner shell in part of the heating area or in the entire heating area, and the annular gap in the heating area has at least partially a diameter of less than 30 mm, wherein one or more heating elements are arranged in the second pressure space in the region surrounding the annular gap in the heating area for heating compressed biomass in the heating area up to 600 to 700 degrees Celsius, and wherein the at least one plant for generation of electricity from renewable energy sources (1) (2) is connected to the heating element in the second pressure space and the heating element in the second pressure space is heated with electricity from renewable energy sources for heating compressed biomass in the heating area up to 600 to 700 degrees Celsius, or the at least one plant for generation of electricity from renewable energy sources (1) (2) is connected to the plurality of heating elements in the second pressure space, and the heating elements in the second pressure space are heated with the electricity from renewable energy sources, for heating compressed biomass in the heating area up to 600 to 700 degrees Celsius.

6. The hybrid power plant according to claim 1 wherein the reactor (3) is connected to the at least one $CH_4$-storage (7) for storing the produced methane produced, and wherein a gas processing plant (4) is located between the reactor (3) and the at least one $CH_4$-storage (7) for separating methane from the synthesis gas, and wherein the $CH_4$-storage (7) is connected to at least one plant for recovery of electricity from stored energy carriers (13) (14), and wherein the plant for recovery of electricity from stored energy carriers (13) (14) is connected to at least one energy consumer (15) (16) that the area comprises for supplying electricity from recovered methane to the at least one energy consumer (15) (16) of the area.

7. A hybrid power plant according to claim 1 wherein the electrolyzer (10) is connected to the $H_2$-storage (6) for storing the hydrogen produced with electricity from renewable energy sources and wherein the $H_2$-storage (6) is connected to the gas processing plant (4) for hydrogenating the synthesis gas produced from biomass and electricity from renewable energy sources or for hydrogenating parts of the synthesis gas produced, and wherein the $H_2$-storage (6) is optionally connected to one or more hydrogen consumers (25) (26) for supplying hydrogen to the one or more hydrogen consumers (25) (26).

8. A hybrid power plant according to claim 1 comprising a plant for methanization (5) for converting hydrogen and carbon dioxide to methane wherein the plant for methanization (5) is connected to the $H_2$-storage (6), the gas processing plant (4) and the $CH_4$-storage (7).

9. A hybrid power plant according to claim 1 comprising at least one heat storage (9), wherein said at least one heat storage (9) is connected to the electrolyzer (10), to the reactor (3) and, if present, to the plant for methanization (5) for storing excess heat and wherein said heat storage (9) is connected to at least one energy consumer (15) (16) of the area and wherein said hybrid power plant optionally comprises a heat pump (11), connected to the plant for generation of electricity from renewable energy sources (1) (2) for converting the waste heat into electricity, and wherein the heat pump (11) is connected to the heat storage (9) for storing heat and to at least one energy consumer (15) (16) of the area for supplying heat to the energy consumer.

10. An energy self-sufficient unit comprising a hybrid power plant according to claim 1 and an area that is self-sufficiently supplied with energy by the hybrid power plant and wherein the area comprises one or more energy consumers (15) (16) and one or more sources of biomass (24), and wherein at least one energy consumer (15) (16) is a building or an industrial plant.

11. A method for self-sufficient energy supply to one or more energy consumers (15) (16), wherein the one or more energy consumers (15) (16) are located on or connected to an area, and wherein the area comprises a hybrid power plant for self-sufficient energy supply according to claim 1, wherein with the one or more plants for generation of electricity from renewable energy sources (1) (2) electricity is generated from renewable energy sources, with the electricity generated from renewable energy sources or a part of the electricity generated from renewable energy sources, the one energy consumer of the area is supplied with electricity, or the several energy consumers of the area are supplied with electricity, excess generated electricity from renewable energy sources or a part of the excess generated electricity from renewable energy sources is used to operate the at least one electrolyzer (10) for electrolysis of water and the production of hydrogen, the hydrogen produced is stored or otherwise used as an energy carrier, wherein at least one energy consumer (15) (16) of the area produces biomass, or the area includes at least one other source of biomass (24), or at least one energy consumer (15) (16) of the area produces biomass and the area includes at least one other source of biomass (24), and excess electricity generated from renewable energy sources or a portion of the excess electricity generated from renewable energy sources is used to operate the reactor (3), for converting excess electricity generated from renewable energy sources and biomass from the at least one source of biomass (24) comprised in the area into synthesis gas that consists essentially of methane, hydrogen, and carbon dioxide, the synthesis gas produced is stored, or part of the synthesis gas produced is separated and stored, or part of the synthesis gas produced is separated, hydrogenated, and stored, stored energy carrier is converted back into electricity and with the electricity generated from stored energy carrier, the one energy consumer of the area or the several energy consumers of the area are supplied with electricity, if no electricity from renewable energy sources is generated with the one plant or the more plants for the generation of electricity from renewable energy sources (1) (2), or not enough electricity from renewable energy sources is generated to supply energy (1) (2) to the energy consumer or consumers (15) (16) of the area.

* * * * *